(12) United States Patent
Ryu et al.

(10) Patent No.: US 12,133,172 B2
(45) Date of Patent: Oct. 29, 2024

(54) TRANSMIT POWER ADJUSTMENT TECHNIQUES IN WIRELESS COMMUNICATIONS

(71) Applicant: QUALCOMM Incorporated, San Diego, CA (US)

(72) Inventors: Jung Ho Ryu, Fort Lee, NJ (US); Arumugam Chendamarai Kannan, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/713,415

(22) Filed: Apr. 5, 2022

(65) Prior Publication Data
US 2023/0319725 A1  Oct. 5, 2023

(51) Int. Cl.
*H04W 52/08* (2009.01)
*H04L 5/14* (2006.01)
*H04W 52/14* (2009.01)
*H04W 52/36* (2009.01)

(52) U.S. Cl.
CPC ............... *H04W 52/08* (2013.01); *H04L 5/14* (2013.01); *H04W 52/146* (2013.01); *H04W 52/36* (2013.01)

(58) Field of Classification Search
CPC ... H04W 52/08; H04W 52/146; H04W 52/36; H04L 5/14
See application file for complete search history.

(56) References Cited

U.S. PATENT DOCUMENTS

| | | | |
|---|---|---|---|
| 9,503,990 B2 * | 11/2016 | Park | H04W 52/58 |
| 2018/0145796 A1 * | 5/2018 | Liang | H04L 1/1861 |
| 2023/0045623 A1 * | 2/2023 | Chen | H04W 72/23 |

FOREIGN PATENT DOCUMENTS

| | | | | |
|---|---|---|---|---|
| CN | 1969472 B | * | 11/2014 | ......... H04W 52/221 |
| CN | 111757447 A | * | 10/2020 | ......... H04W 52/146 |
| WO | WO-2023159409 A1 | * | 8/2023 | |

* cited by examiner

*Primary Examiner* — Ahmed Elallam
(74) *Attorney, Agent, or Firm* — Holland & Hart LLP

(57) ABSTRACT

Methods, systems, and devices for wireless communications are described that provide for temporary transmit power control adjustments for one or more transmissions, such as transmissions when a device that is to receive the transmissions is operating in a full duplex mode. A network entity may operate in a full duplex mode for a first slot, and may provide a user equipment (UE) with a transmit power control command to make an adjustment in uplink transmit power for uplink transmissions in the first slot. The UE may transmit according to a first uplink transmit power prior to the first slot, transmit at an adjusted second transmit power during the first slot, and then transmit according to the first uplink transmit power for uplink transmissions subsequent to the first slot.

30 Claims, 19 Drawing Sheets

TRANSMIT POWER ADJUSTMENT TECHNIQUES IN WIRELESS COMMUNICATIONS

FIELD OF TECHNOLOGY

The following relates to wireless communications, including transmit power adjustment techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, some devices (e.g., base stations, transmission-reception points, radio heads, or other network entities) may operate in a full duplex mode in which the device transmits signals and receives signals using a same set of wireless resources (e.g., a same set of time and frequency resources). Efficient techniques for reliable communications when a device is operating in full duplex mode can help to enhance network efficiency, enhance network throughput, and create an enhanced user experience.

SUMMARY

The described techniques relate to improved methods, systems, devices, and apparatuses that support transmit power adjustment techniques in wireless communications. In accordance with various aspects, described techniques provide for transmit power control adjustments that are applied for one or more transmissions, such as transmissions when a device that is to receive the transmissions is operating in a full duplex mode, and then removed subsequent to the one or more transmissions. For example, a network entity may operate in a full duplex mode for a first slot, and may provide a user equipment (UE) with a transmit power control command to make an adjustment in uplink transmit power for uplink transmissions in the first slot (e.g., to transmit at a higher power for the first slot). The UE may transmit according to a first uplink transmit power prior to the first slot, transmit at an adjusted second transmit power during the first slot, and then transmit according to the first uplink transmit power for uplink transmissions subsequent to the first slot. In some cases, the network entity may provide an indication that the UE is to perform a one-time power adjustment for an uplink transmission in the first slot in downlink control information (e.g., in a one-time adjustment field indication in the downlink control information).

A method for wireless communication at a user equipment (UE) is described. The method may include receiving a first transmit power control command in a closed loop transmit power control procedure in which adjustments to transmit power are accumulated over multiple transmit power control commands, setting an uplink transmit power, based on the first transmit power control command, to a first transmit power, receiving a second transmit power control command to make a temporary adjustment to the uplink transmit power, adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command, and transmitting the one or more transmissions associated with the second transmit power control command at the second transmit power.

An apparatus for wireless communication at a UE is described. The apparatus may include a processor, and a memory coupled with the processor, with instructions stored in the memory, the instructions being executable by the processor to cause the apparatus to receive a first transmit power control command in a closed loop transmit power control procedure in which adjustments to transmit power are accumulated over multiple transmit power control commands, set an uplink transmit power, based on the first transmit power control command, to a first transmit power, receive a second transmit power control command to make a temporary adjustment to the uplink transmit power, adjust the uplink transmit power to a second transmit power based on the second transmit power control command for one or more transmissions associated with the second transmit power control command, where the uplink transmit power is returned to the first transmit power subsequent to the one or more transmissions associated with the second transmit power control command, and transmit the one or more transmissions associated with the second transmit power control command at the second transmit power.

Another apparatus for wireless communication at a UE is described. The apparatus may include means for receiving a first transmit power control command in a closed loop transmit power control procedure in which adjustments to transmit power are accumulated over multiple transmit power control commands, means for setting an uplink transmit power, based on the first transmit power control command, to a first transmit power, means for receiving a second transmit power control command to make a temporary adjustment to the uplink transmit power, means for adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command, and means for transmitting the one or more transmissions associated with the second transmit power control command at the second transmit power.

A non-transitory computer-readable medium storing code for wireless communication at a UE is described. The code may include instructions executable by a processor to receive a first transmit power control command in a closed loop transmit power control procedure in which adjustments to transmit power are accumulated over multiple transmit power control commands, set an uplink transmit power, based on the first transmit power control command, to a first transmit power, receive a second transmit power control command to make a temporary adjustment to the uplink transmit power, adjust the uplink transmit power to a second transmit power based on the second transmit power control command for one or more transmissions associated with the second transmit power control command, where the uplink transmit power is returned to the first transmit power subsequent to the one or more transmissions associated with the second transmit power control command, and transmit the one or more transmissions associated with the second transmit power control command at the second transmit power.

In some examples of the method, apparatuses, and non-transitory computer-readable medium described herein, the adjusting the uplink transmit power may include operations, features, means, or instructions for performing a one-time power adjustment for a first uplink transmission after receipt of the second transmit power control command and adjusting the transmit power back to the first transmit power after the first uplink transmission. In some examples of the method, apparatuses, and non-transitory computer-readable medium described herein, the second transmit power control command provides an increased power adjustment for a full duplex slot in which a network entity transmits to a different UE concurrently with receiving the one or more transmissions associated with the temporary adjustment. In some examples of the method, apparatuses, and non-transitory computer-readable medium described herein, the temporary adjustment to the uplink transmit power may be performed according to an accumulation mode of the closed loop transmit power control procedure.

In some examples of the method, apparatuses, and non-transitory computer-readable medium described herein, the receiving the second transmit power control command may include operations, features, means, or instructions for receiving a transmit power control command with a one-time application indication in a downlink control information transmission that schedules the one or more transmissions associated with the temporary adjustment. In some examples of the method, apparatuses, and non-transitory computer-readable medium described herein, the receiving a second transmit power control command may include operations, features, means, or instructions for receiving a transmit power control command with a one-time application indication in a downlink control information transmission that is separate from a downlink control information transmission that schedules the one or more transmissions associated with the temporary adjustment.

In some examples of the method, apparatuses, and non-transitory computer-readable medium described herein, the second transmit power control command includes a one-time application indication field that indicates that an adjustment provided in a transmit power control command field is mapped to a set of power adjustment values that are different from values used for accumulation mode power control. In some examples of the method, apparatuses, and non-transitory computer-readable medium described herein, the set of power adjustment values provide increased uplink transmit power relative to power adjustments that are applied in an absence of the one-time application indication field indicating the temporary adjustment to the uplink transmit power.

A method for wireless communication at a network entity is described. The method may include transmitting, to a first UE, a first transmit power control command in a closed loop transmit power control procedure in which adjustments to uplink transmit power are accumulated over multiple transmit power control commands, the first transmit power control command indicating the first UE is to use a first transmit power, transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission, and receiving the first uplink transmission while transmitting one or more downlink transmissions to at least a second UE.

An apparatus for wireless communication at a network entity is described. The apparatus may include a processor, and a memory coupled with the processor, with instructions stored in the memory, the instructions being executable by the processor to cause the apparatus to transmit, to a first UE, a first transmit power control command in a closed loop transmit power control procedure in which adjustments to uplink transmit power are accumulated over multiple transmit power control commands, the first transmit power control command indicating the first UE is to use a first transmit power, transmit a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission, and receive the first uplink transmission while transmitting one or more downlink transmissions to at least a second UE.

Another apparatus for wireless communication at a network entity is described. The apparatus may include means for transmitting, to a first UE, a first transmit power control command in a closed loop transmit power control procedure in which adjustments to uplink transmit power are accumulated over multiple transmit power control commands, the first transmit power control command indicating the first UE is to use a first transmit power, means for transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission, and means for receiving the first uplink transmission while transmitting one or more downlink transmissions to at least a second UE.

A non-transitory computer-readable medium storing code for wireless communication at a network entity is described. The code may include instructions executable by a processor to transmit, to a first UE, a first transmit power control command in a closed loop transmit power control procedure in which adjustments to uplink transmit power are accumulated over multiple transmit power control commands, the first transmit power control command indicating the first UE is to use a first transmit power, transmit a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission, and receive the first uplink transmission while transmitting one or more downlink transmissions to at least a second UE.

In some examples of the method, apparatuses, and non-transitory computer-readable medium described herein, the second transmit power control command indicates that the first UE is to perform a one-time power adjustment for the first uplink transmission after receipt of the second transmit power control command, and that the first UE is to adjust the uplink transmit power back to the first transmit power after the first uplink transmission. In some examples of the method, apparatuses, and non-transitory computer-readable medium described herein, the second transmit power control command provides an increased power adjustment for a full duplex slot in which the network entity transmits to at least the second UE concurrently with receiving one or more transmissions associated with the temporary adjustment. In some examples of the method, apparatuses, and non-transitory computer-readable medium described herein, the temporary adjustment to the uplink transmit power may be performed according to an accumulation mode of the closed loop transmit power control procedure.

In some examples of the method, apparatuses, and non-transitory computer-readable medium described herein, the transmitting the second transmit power control command may include operations, features, means, or instructions for transmitting a transmit power control command with a one-time application indication in a downlink control information transmission that schedules the first uplink transmission. In some examples of the method, apparatuses, and non-transitory computer-readable medium described herein, the transmitting the second transmit power control command may include operations, features, means, or instructions for transmitting a transmit power control command with a one-time application indication in a downlink control information transmission that is separate from a downlink control information transmission that schedules the first uplink transmission.

In some examples of the method, apparatuses, and non-transitory computer-readable medium described herein, the second transmit power control command includes a one-time application indication field that indicates that an adjustment provided in a transmit power control command field is mapped to a set of power adjustment values that are different from values used for accumulation mode power control. In some examples of the method, apparatuses, and non-transitory computer-readable medium described herein, the set of power adjustment values provide increased uplink transmit power relative to power adjustments that are applied in an absence of the one-time application indication field indicating the temporary adjustment to the uplink transmit power.

DETAILED DESCRIPTION

Figure 1:
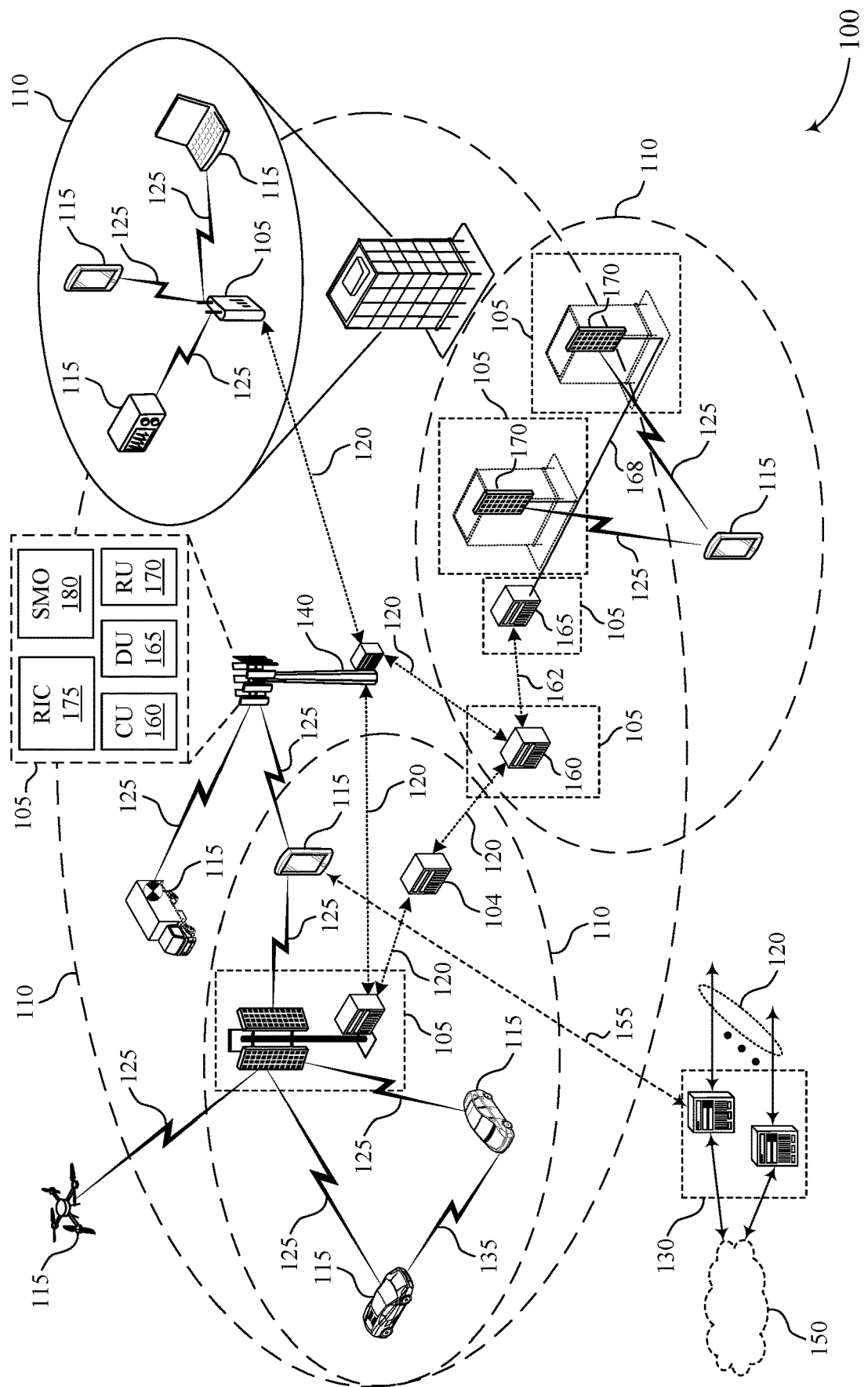
FIG. 1 illustrates an example of a wireless communications system that supports transmit power adjustment techniques in wireless communications in accordance with one or more aspects of the present disclosure.

In some systems, one or more devices, such as a network entity or a user equipment (UE), may operate in a full duplex mode in which the device transmits signals and receives signals using a same set of wireless resources (e.g., a same set of time and frequency resources). When a device is operating in full duplex mode, concurrent transmission and reception may result in self-interference where transmitted signals interfere with signals that are to be concurrently received. One technique to mitigate such self-interference is to have a transmitting device transmit at a higher power during periods of full duplex operation. For example, a network entity may operate in a full duplex mode for one or more identified slots (e.g., concurrent uplink and downlink communications in the identified slots), and may operate in a half-duplex mode (e.g., uplink communications or downlink communications) for one or more slots before or after the identified slots. To mitigate self-interference for the identified slots, the network entity may have transmitting UEs adjust a transmission power for uplink transmissions in the identified slots. The added transmission power from the UEs in such cases can substantially mitigate self-interference at the network entity, but is unnecessary for slots other than the identified slots for full duplex communications. In some cases, full duplex communications may be used for relatively few slots in a radio frame, and thus power adjustments from transmitting UEs to mitigate self-interference is unnecessary for other than the relatively few slots with full duplex communications. However, providing control information to change transmit powers to an adjusted transmit power for the full duplex slots and then back to unadjusted transmit power for other slots can consume substantial signaling overhead.

Various aspects of the present disclosure provide power control techniques that allow for temporary adjustments of transmit powers with relatively low overhead. In some cases, a transmit power control (TPC) command can indicate to a UE that an uplink transmit power adjustment value in the TPC command is to be applied only to a next uplink transmission (e.g., or one or more next uplink transmissions), and the uplink transmit power reverts back to being based on a prior TPC value subsequent to the one or more uplink transmissions associated with the transmit power adjustment. In some cases, a TPC command provided in downlink control information (DCI) may have a field that indicates a 'one-time' application to indicate to the UE to transmit with increased transmit power for only uplink transmission occasion(s) (e.g., physical uplink shared channel (PUSCH) transmission occasion(s)) corresponding to full duplex slots. A TPC command with the 'one-time' application indication may be applied in cases where the UE is operating using a transmit power control adjustment state in accumulation mode. For example, a TPC command with the 'one-time' application indication can be included in a DCI (e.g., DCI format 0_0 or 0_1) that schedules a next uplink transmission, or in a DCI (e.g., DCI format 2_2, or TPC command DCI) that is separate from the DCI that schedules the next uplink transmission. In some cases, the 'one-time' application indication field in the TPC command may include an adjustment index value that can map to power control adjustment values different from the values used for regular TPC in accumulation mode (e.g., in which the TPC adjustment is not a one-time adjustment).

Such techniques can provide for uplink transmit power adjustments for one or more identified slots (e.g., one or more full duplex slots) while maintaining prior transmit power determination for other slots, which may help to enhance reliability of communications in the identified slots (e.g., to mitigate self-interference in full duplex slots). Such techniques thus enhance network efficiency through reduced overhead, and enhance reliability and throughput through mitigation of interference in the identified slots. Described techniques also provide for reduced power consumption through fewer control information transmissions while providing for application of power control adjustments that are targeted for transmissions in which increased transmit power would be beneficial, and other transmissions may use lower transmit power.

Aspects of the disclosure are initially described in the context of wireless communications systems. Examples, of transmission slots in which increased interference may be present, and a process flow are then discussed. Aspects of the disclosure are further illustrated by and described with reference to apparatus diagrams, system diagrams, and flowcharts that relate to transmit power adjustment techniques in wireless communications.

FIG. 1 illustrates an example of a wireless communications system 100 that supports transmit power adjustment techniques in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transmit power adjustment techniques in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some cases, one or more devices, such as one or more network entities 105, may operate in a full duplex mode in which concurrent uplink and downlink transmissions use a same set of wireless resources for some slots. In some cases, a network entity 105 may provide a TPC command that indicates to one or more UEs 115 that an uplink transmit power adjustment value in the TPC command is to be applied only to an identified uplink transmission (e.g., a next uplink transmission or one or more next uplink transmissions), and the uplink transmit power reverts back to be based on a prior TPC value subsequent to the identified uplink transmission associated with the transmit power adjustment. In some cases, a TPC command provided in DCI may have a field that indicates a one-time application to indicate to the UE 115 to transmit with increased transmit power for only uplink transmission occasion(s) (e.g., PUSCH transmission occasion(s)) corresponding to full duplex slots. A TPC command with the one-time application indication may be applied in cases where the UE 115 is operating using a transmit power control adjustment state in accumulation mode. For example, a TPC command with the one-time application indication can be included in a DCI (e.g., DCI format 0_0 or 0_1) that schedules a next uplink transmission, or in a DCI (e.g., DCI format 2_2, or TPC command DCI) that is separate from the DCI that schedules the next uplink transmission. In some cases, the one-time application indication field in the TPC command may include an adjustment index value that can map to power control adjustment values different from the values used for regular TPC in accumulation mode (e.g., in which the TPC adjustment is not a one-time adjustment).

Figure 2:
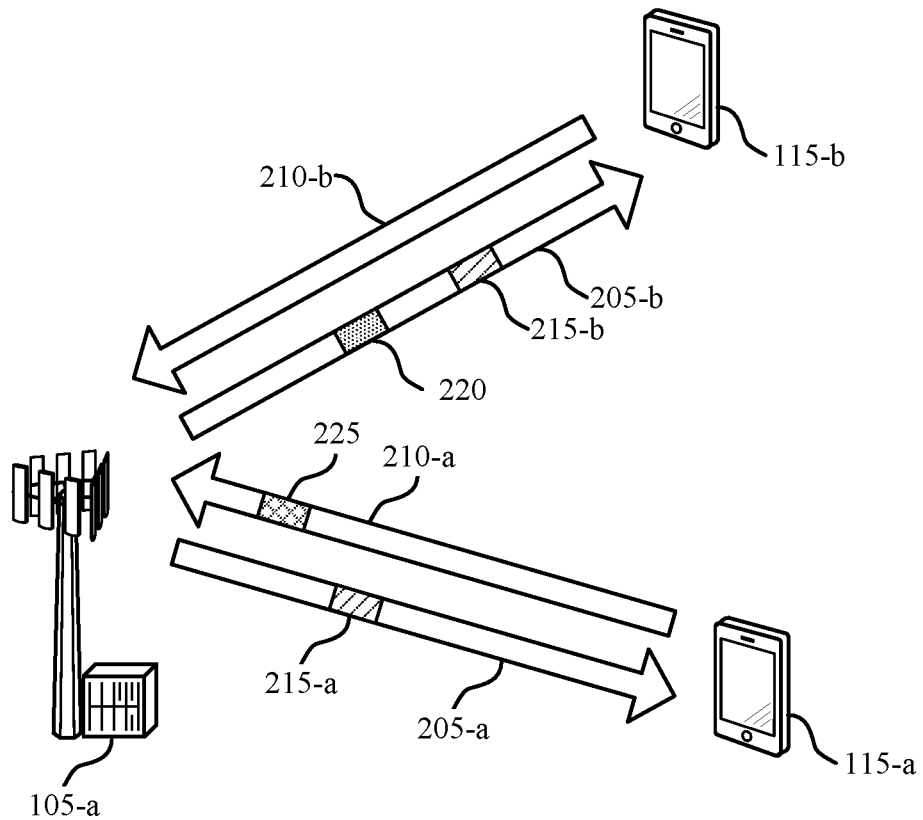
FIG. 2 illustrates an example of a wireless communications system that supports transmit power adjustment techniques in wireless communications in accordance with one or more aspects of the present disclosure.

FIG. 2 illustrates an example of a wireless communications system 200 that supports transmit power adjustment techniques in wireless communications in accordance with one or more aspects of the present disclosure. The wireless communications system 200 may include a network entity 105-*a*, a first UE 115-*a*, and a second UE 115-*b*, which may represent examples of a network entity 105 and UE 115 as described with reference to FIG. 1.

In this example, the first UE 115-*a* may communicate with the network entity 105-*a* via a first downlink carrier 205-*a* and a first uplink carrier 210-*a* (e.g., which may be different carriers operating using FDD, or a same carrier operating using TDD). The second UE 115-*b* may communicate with the network entity 105-*a* via a second downlink carrier 205-*b* and a second uplink carrier 210-*b*. In the example of FIG. 2, the network entity 105-*a*, for at least some communications, may operate in a full duplex mode in which a first set of resources may be used for both uplink and downlink communications. For example, an uplink transmission 225 from the first UE 115-*a* is received concurrently with a downlink transmission 220 to the second UE 115-*b* (e.g., using a same set of time and frequency resources).

In some cases, the network entity 105-*a* may provide scheduling information, TPC commands, or both, to each of the UEs 115 using DCI 215. For example, the network entity 105-*a* may schedule one or more uplink transmissions 225 for the first UE 115-*a* in first DCI 215-*a*. The network entity 105-*a* may also schedule, via second DCI 215-*b*, one or more downlink transmissions 220 for the second UE 115-*b* that may in some cases use a same set of resources as the uplink transmissions 225. In cases where the network entity 105-*a* is operating in full duplex mode, the downlink transmissions 220 may causes self-interference to the uplink transmissions 225, and it may be desirable to mitigate such self-interference in order to reliably receive and decode the uplink transmissions 225. As discussed herein, in some cases an increased uplink transmission power may help to mitigate self-interference.

In some cases, the DCI 215 that schedules uplink communications may provide information for uplink power control, such as through one or more parameters that are used by the first UE 115-*a* to set an uplink transmit power. For example, PUSCH power control may be based on an established power control procedure that is specified by a communications standard used for communications between the UEs 115 and network entities 105, such as in 3GPP specifications which provide that uplink PUSCH power ($P_{PUSCH}$) is determined according to:

$$P_{PUSCH,b,f,c}(i, j, q_d, l) = \min\left\{\begin{array}{l}P_{CMAX,f,c}(i), \\ P_{O_{PUSCH},b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l)\end{array}\right\}[dBm],$$

where b is the uplink bandwidth part, f is the carrier frequency, c is the serving cell, i is the transmission occasion, j is a parameter set configuration index, $q_d$ is a reference signal index, and l is a PUSCH power control adjustment index; $P_{CMAX,f,c}$ is the configured maximum UE output power; $P_{0\_PUSCH}$ is an open loop power control parameter for controlling a received power level, M is a bandwidth of the PUSCH resource assignment, $\alpha$ is a pathloss (PL) compensation scaling factor which may be referred to herein as 'alpha,' PL is a PL value based on a measured reference signal, $\Delta$ is based on a modulation and coding scheme (MCS), and f is a closed loop power control component based on transmit power control (TPC) commands with a closed loop index l. In such cases, open loop power control parameters include values for $P_0$, and $\alpha$ that may be provided in a set of open loop power control parameters.

The closed loop power control parameter $f_{b,f,c}(i, l)$ in such instances represents the closed loop power control, and can be computed based on TPC commands previously received at a UE 115, in which i is the PUSCH transmission occasion, and l is the power control adjustment state index. In some cases, a UE 115 can be configured in one or two adjustment states, and the UE 115 may maintains a separate power control calculation for each adjustment state. TPC commands from the network entity 105-*a* may be used to update a specific adjustment state (e.g., a specific adjustment state is indicated by TPC). In some case, a TPC command received by the first UE 115-*a* in a DCI 2_2 format may specify to which adjustment state the TPC command applies.

In other cases, if a TPC command is received in a DCI 0_0 or 0_1 format, the adjustment state to which the TPC command applies can be determined based on the PUSCH being scheduled by the received DCI 0_0 or 0_1. When PUSCH transmit power for uplink transmission 225, the first UE 115-a thus is aware of which adjustment state to use in the PUSCH power calculation.

In some modes of operation, the closed loop power control parameter $f_{b,f,c}(i, l)$ may be computed based on TPC commands previously received, such as when the first UE 115-a operates in an accumulation mode. With accumulation, $f_{b,f,c}(i, l)$ may be given by:

$$f_{b,f,c}(i,l) = f_{b,f,c}(i-i_0, l) + \sum_{m=0}^{C(D_i)-1} \delta_{PUSCH,b,f,c}(m, l)$$

where $\delta_{PUSCH,b,f,c}(m, l)$ is the m-th TPC command for adjustment state l. The sum adds all TPC commands for adjustment state l that have been received since PDCCH resource allocation for the previous PUSCH transmission using adjustment state l. Use of TPC command accumulation allows fine tuning of uplink transmit power and allows $f_{b,f,c}(i, l)$ to have a potentially large value. In other cases, an absolute mode may be used without accumulation, and $f_{b,f,c}(i, l) = \delta_{PUSCH,b,f,c}(i, l)$ where $\delta_{PUSCH,b,f,c}(i, l)$ is a TPC command value included in a DCI format that schedules the PUSCH transmission occasion i. Whether the adjustment state is in accumulation mode or in absolute mode, in some cases, may be determined by a configured parameter tpc-Accumulation in PUSCH-PowerControl. In such cases, if tpc-Accmulation is absent in PUSCH-PowerControl, then the adjustment state is in accumulation mode. In some cases, the TPC command value may be included in a two-bit field in the DCI that maps into a power adjustment such as provided in Table 1:

TABLE 1

| TPC Command Field | Accumulated $\delta_{PUSCH, b, f, c}$[dB] | Absolute $\delta_{PUSCH, b, f, c}$[dB] |
|---|---|---|
| 0 | −1 | −4 |
| 1 | 0 | −1 |
| 2 | 1 | 1 |
| 3 | 3 | 4 |

As discussed herein, when the network entity 105-a operates in full duplex mode in a slot (e.g., transmitting downlink transmission 220 and receiving uplink transmission 225 in the slot), it may be beneficial to have the uplink transmission 225 of the first UE 115-a transmitted with higher power in a full duplex slot, which may help to mitigate self-interference. However, in subsequent half duplex slots, first UE 115-a can resume transmitting with a normal unadjusted uplink transmit power. Techniques as discussed herein provide for efficient communication and power adjustment for such full duplex slots, without having to transmit multiple iterations of TPC commands to make a desired adjustment for a full duplex slot and then a subsequent adjustment for half-duplex slots.

In some cases, the network entity 105-a may transmit a TPC command in first DCI 215-a (e.g., in a separate field in DCI) that indicates to the first UE 115-a that the TPC command (e.g., uplink transmit power adjustment value) is to be applied only to the next uplink transmission (e.g., an uplink transmission associated with a full duplex slot). For example, the TPC command with the indication of 'one-time' application may indicate to the first UE 115-a to transmit uplink transmission 225 with increased transmit power for just one PUSCH transmission occasion (e.g., which will be in a full duplex slot), with an unadjusted transmit power used for subsequent PUSCH transmission occasions. The first UE 115-a to which the TPC command with the 'one time' application indication applies when operating with the adjustment state in accumulation mode, and apply the power adjustment of the TPC command for only the uplink transmission 225. In some case, the first DCI 215-a may include an indication of a temporary power adjustment (e.g., a one-time adjustment) in an information field, and an associated TPC command in another field. In some cases, the information may be included in a DCI 0_0 or 0_1 format that schedules the next uplink transmission, or the power control information may be provided in a DCI (e.g., DCI 2_2 format for TPC command) that is separate from the first DCI 215-a that schedules the next uplink transmission. Further, in some cases, the TPC command field in the TPC command with the temporary power adjustment indication can map to values different from the values shown in the Table 1, which may allow for different power adjustment values for such temporary power adjustments. For example, in cases where the temporary power adjustment is indicated, a TPC command field value of 0 (e.g., in a two bit command field that indicates 0,0) may indicate a 3 dB power adjustment, a TPC command field value of 1 (e.g., in a two bit command field that indicates 0,1) may indicate a 4 dB power adjustment, a TPC command field value of 2 (e.g., in a two bit command field that indicates 1,0) may indicate a 5 dB power adjustment, and a TPC command field value of 3 (e.g., in a two bit command field that indicates 1,1) may indicate a 6 dB power adjustment. In cases where the temporary power adjustment is not indicated, the mapping of Table 1 may be used.

Figure 3:
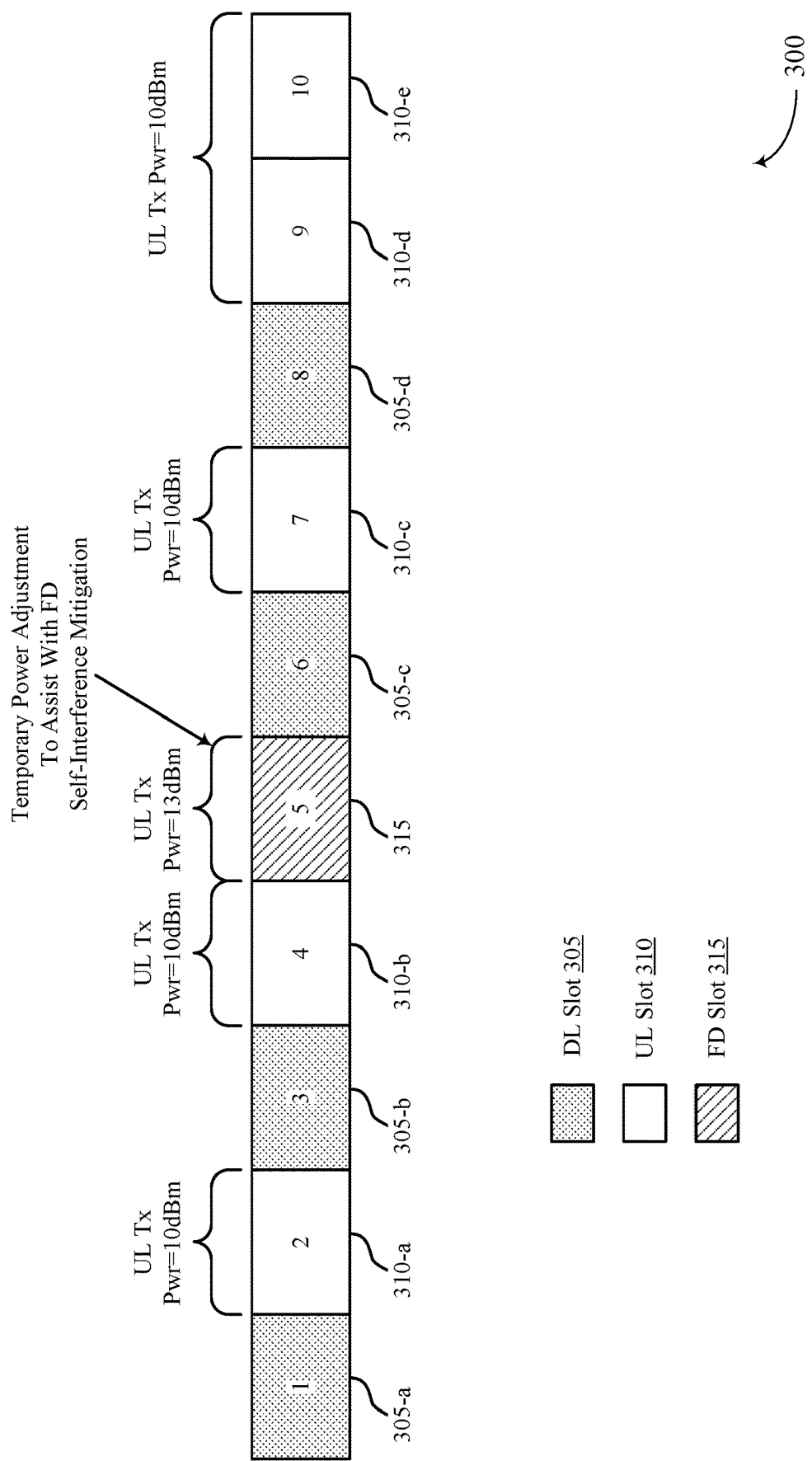
FIG. 3 illustrates an example a uplink, downlink, and full duplex slots that support transmit power adjustment techniques in wireless communications in accordance with one or more aspects of the present disclosure.

FIG. 3 illustrates an example of uplink, downlink, and full duplex slots 300 that support transmit power adjustment techniques in wireless communications in accordance with one or more aspects of the present disclosure. The slots 300 may be used for communications between a UE and a network entity, which may be examples of UEs 115 and network entities 105 as described with reference to FIGS. 1 and 2. In some examples, a network entity may transmit control information to a UE that schedules uplink transmissions, and that indicates transmit power control adjustments (e.g., in a same DCI or in separate DCIs).

In the example of FIG. 3, a number of downlink slots 305, a number of uplink slots 310, and a full duplex slot 315, may be present. One or more UEs may receive downlink communications in downlink slots 305, including in a first downlink slot 305-a, a second downlink slot 305-b, a third downlink slot 305-c, and a fourth downlink slot 305-d. One or more UEs may also transmit uplink communications in uplink slots 310, using an uplink transmit power that is set based on TPC commands. For example, a first UE may transmit uplink transmissions in a first uplink slot 310-a and a second uplink slot 310-b using an uplink transmit power of 10 dBm (e.g., based on one or more TPC commands when operating in an accumulation mode). In this example, for full duplex slot 315, the network entity may transmit a temporary power adjustment to the UE, and the uplink transmit power may be set to 13 dBm for the full duplex slot 315. Subsequent to the full duplex slot 315, and without a transmission of a new TPC command, the UE may transmit uplink transmissions in third through fifth uplink slots 310-c through 310-e using an uplink transmit power of 10 dBm (e.g., based on the one or more TPC commands that were applied for the first and second uplink slots 310-*a* and 310-*b*). While this example uses a same uplink transmit power for each of the half-duplex uplink slots, in other examples regular TPC commands in accumulation mode may be provided separately from the TPC command with the temporary indication, in which cases the UE would adjust uplink transmit power in accordance with regular TPC procedures.

Figure 4:
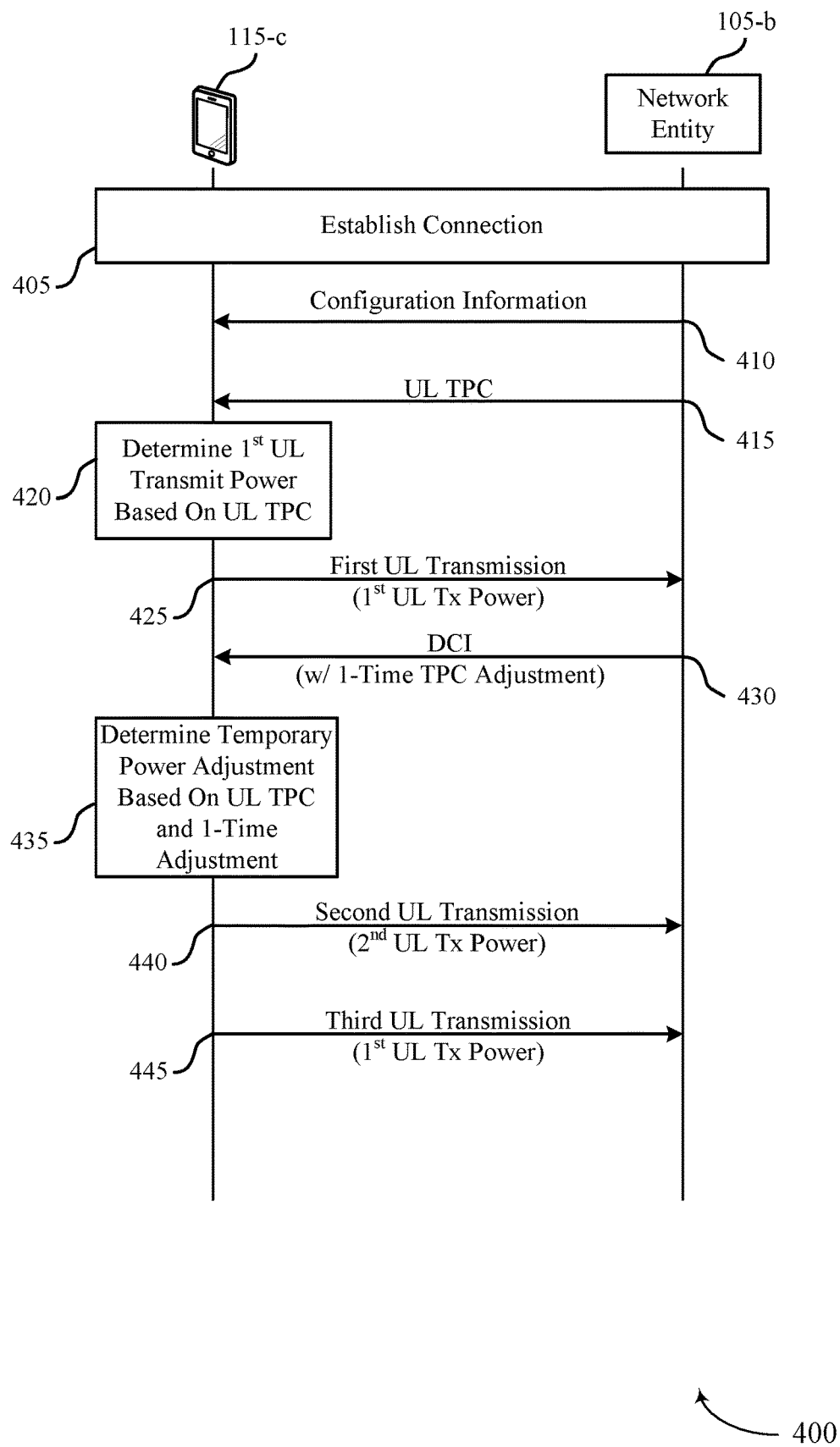
FIG. 4 illustrates an example of a process flow that supports transmit power adjustment techniques in wireless communications in accordance with one or more aspects of the present disclosure.

FIG. 4 illustrates an example of a process flow 400 that supports transmit power adjustment techniques in wireless communications in accordance with one or more aspects of the present disclosure. The process flow 400 may include various aspects of the present disclosure described with reference to FIGS. 1 through 3. For example, the process flow 400 may illustrate communications between a UE 115-*c* and a network entity 105-*b*, which may be examples of corresponding devices as described with reference to FIGS. 1 through 3. In some examples, the network entity 105-*b* may transmit a configuration for transmit power control and the UE 115-*c* and network entity 105-*b* may communicate in accordance with the configured power control for one or multiple transmissions. Alternative examples of the following may be implemented, where some steps are performed in a different order than described or are not performed at all. In some cases, a step may include additional features not mentioned below, or further steps may be added.

At 405, the network entity 105-*b* and UE 115-*c* may establish a connection for communications. In some cases, the connection establishment may be performed in accordance with connection establishment techniques for a wireless communication system (e.g., through a RRC connection establishment or reestablishment procedure).

At 410, the network entity 105-*b* may transmit configuration information to the UE 115-*c*. The configuration information may include, for example, configuration for determining uplink transmit power and configuration for open loop power control parameters (e.g., as discussed with reference to FIGS. 1 through 3), or any combinations thereof. The configuration information may be provided in RRC signaling (e.g., as part of the connection establishment procedure or separately from the connection establishment procedure), for example.

At 415, the network entity 105-*b* may transmit a TPC that indicates an uplink transmit power or power adjustment (e.g., in an accumulation mode) to be made for uplink transmissions from the UE 115-*c*. In some cases, the TPC may be transmitted in DCI that provides scheduling information for one or more uplink transmissions. At 420, the UE 115-*c* may determine a first uplink transmit power based on the TPC provided by the network entity 105-*b*. For example, the UE 115-*c* may determine a first uplink transmit power for a PUSCH transmission in accordance with the transmit power determination techniques discussed with reference to FIG. 2. At 425, the UE 115-*c* may transmit a first uplink transmission to the network entity 105-*b* using the determined first uplink transmit power.

At 430, the network entity 105-*b* may transmit DCI that may be received at the UE 115-*c*, where the DCI indicates a one time TPC adjustment. In some cases, the network entity 105-*b* may transmit the one time TPC adjustment based on an upcoming full duplex slot during which the UE 115-*c* is to transmit uplink communications. In some cases, the DCI may be a scheduling DCI that schedules the uplink transmission in the full duplex slot. In other cases, the DCI with the temporary TPC adjustment may be separate from a DCI that schedules uplink communications in a full duplex slot. In some cases, the DCI may include a TPC command field (e.g., a 2-bit field that indicates a TPC adjustment in accumulation mode) and a one time indication field (e.g., a 1-bit field associated with the TPC command field that indicates the TPC command is to be applied for only the next uplink transmission or for a specified number of uplink transmissions). At 435, the UE 115-*c* may determine a temporary power adjustment based on the TPC command and the one time indication, and determine a second uplink transmit power based on the temporary power adjustment. The temporary power adjustment may be made in accordance with techniques as discussed with reference to FIGS. 2 and 3, for example. At 440, the UE 115-*c* may transmit a second uplink transmission at the second uplink transmit power. At 445, the UE 115-*c* may transmit a third uplink transmission using the first uplink transmit power (e.g., in a half-duplex slot that does not have an associated temporary power adjustment).

Figure 5:
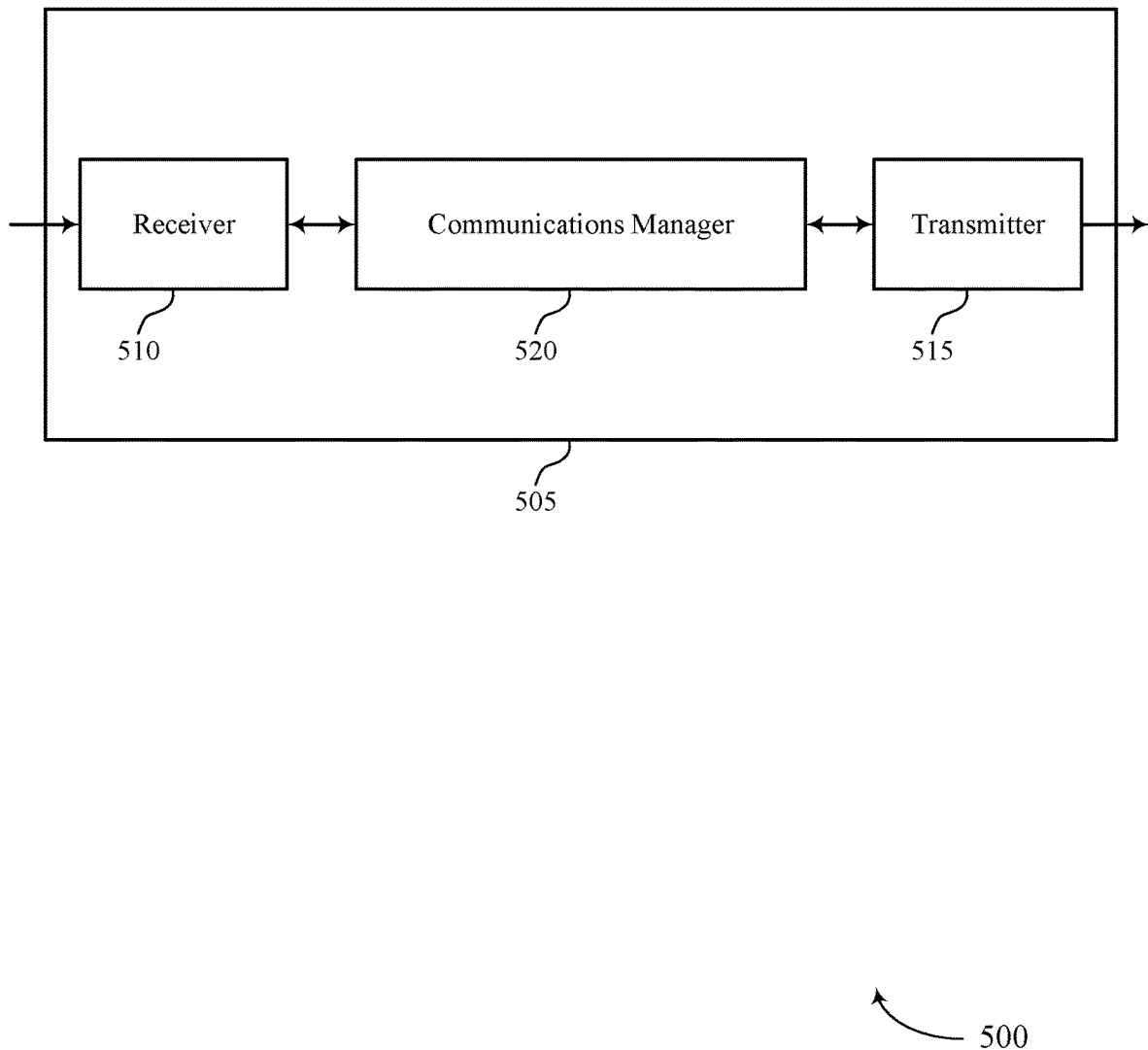
FIGS. 5 and 6 show block diagrams of devices that support transmit power adjustment techniques in wireless communications in accordance with one or more aspects of the present disclosure.

FIG. 5 shows a block diagram 500 of a device 505 that supports transmit power adjustment techniques in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to transmit power adjustment techniques in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to transmit power adjustment techniques in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of transmit power adjustment techniques in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a first transmit power control command in a closed loop transmit power control procedure in which adjustments to transmit power are accumulated over multiple transmit power control commands. The communications manager 520 may be configured as or otherwise support a means for setting an uplink transmit power, based on the first transmit power control command, to a first transmit power. The communications manager 520 may be configured as or otherwise support a means for receiving a second transmit power control command to make a temporary adjustment to the uplink transmit power. The communications manager 520 may be configured as or otherwise support a means for adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The communications manager 520 may be configured as or otherwise support a means for transmitting the one or more transmissions associated with the second transmit power control command at the second transmit power.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for transmit power adjustments for one or more identified slots while maintaining transmit power according unadjusted determinations for other slots, which may help to enhance reliability of communications in the identified slots, enhance network efficiency through reduced overhead, and enhance throughput through mitigation of interference in the identified slots. Described techniques may also provide for reduced power consumption through fewer control information transmissions that provide for application of power control adjustments that are targeted for transmissions in which increased transmit power would be beneficial, while other transmissions may use lower transmit power.

Figure 6:
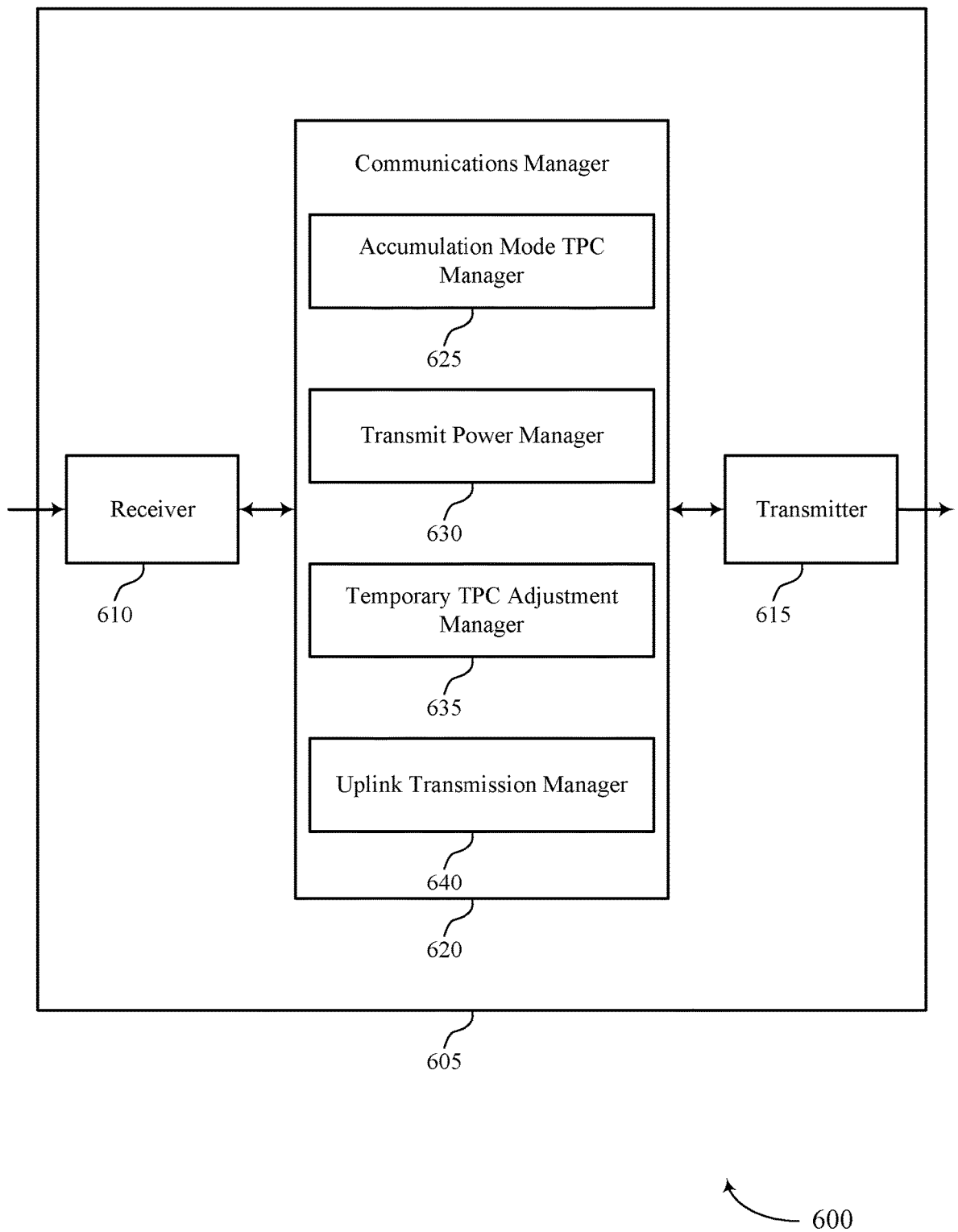

FIG. 6 shows a block diagram 600 of a device 605 that supports transmit power adjustment techniques in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit power adjustment techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit power adjustment techniques in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of transmit power adjustment techniques in wireless communications as described herein. For example, the communications manager 620 may include an accumulation mode TPC manager 625, a transmit power manager 630, a temporary TPC adjustment manager 635, an uplink transmission manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The accumulation mode TPC manager 625 may be configured as or otherwise support a means for receiving a first transmit power control command in a closed loop transmit power control procedure in which adjustments to transmit power are accumulated over multiple transmit power control commands. The transmit power manager 630 may be configured as or otherwise support a means for setting an uplink transmit power, based on the first transmit power control command, to a first transmit power. The temporary TPC adjustment manager 635 may be configured as or otherwise support a means for receiving a second transmit power control command to make a temporary adjustment to the uplink transmit power. The transmit power manager 630 may be configured as or otherwise support a means for adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The uplink transmission manager 640 may be configured as or otherwise support a means for transmitting the one or more transmissions associated with the second transmit power control command at the second transmit power.

Figure 7:
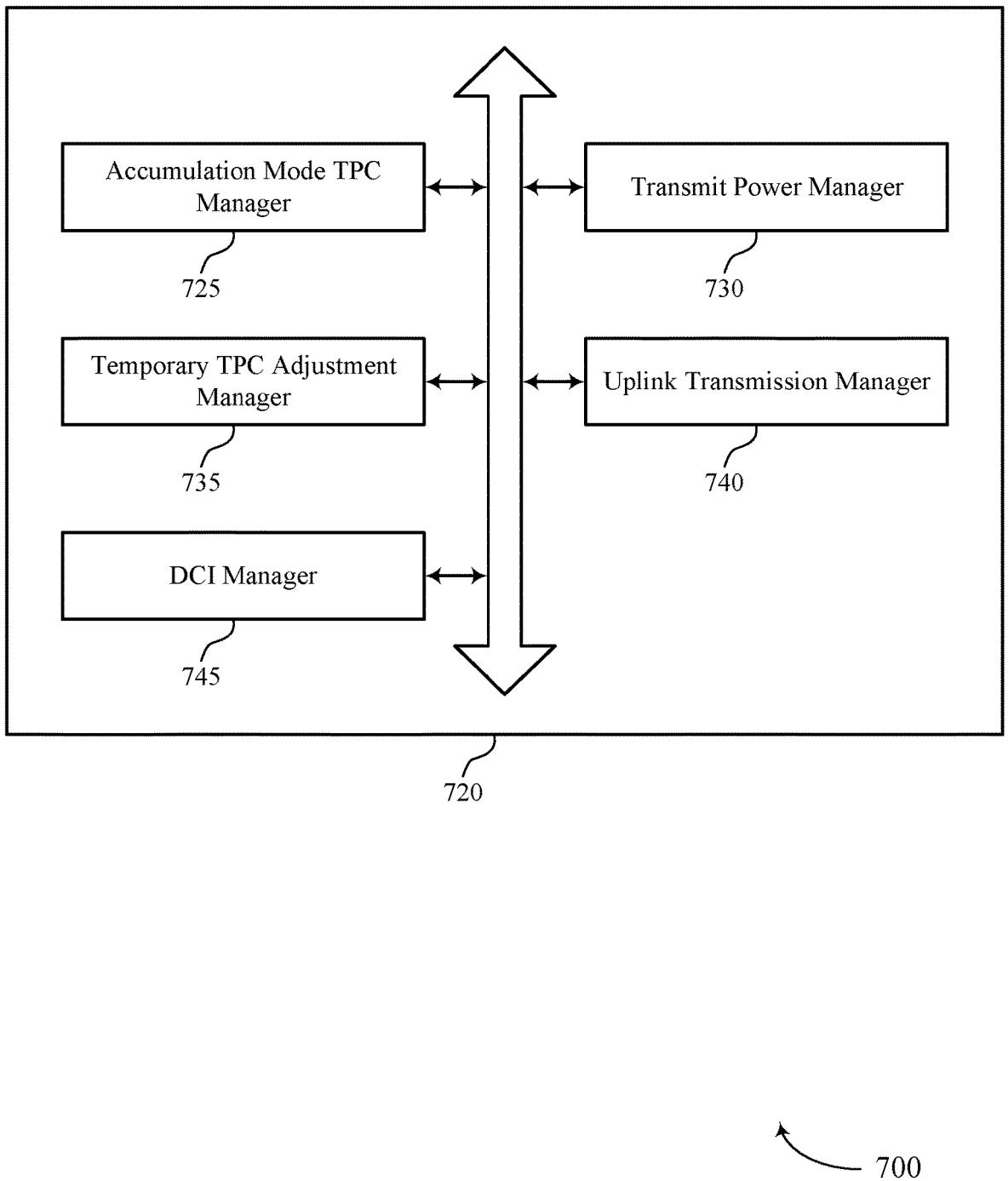
FIG. 7 shows a block diagram of a communications manager that supports transmit power adjustment techniques in wireless communications in accordance with one or more aspects of the present disclosure.

FIG. 7 shows a block diagram 700 of a communications manager 720 that supports transmit power adjustment techniques in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of transmit power adjustment techniques in wireless communications as described herein. For example, the communications manager 720 may include an accumulation mode TPC manager 725, a transmit power manager 730, a temporary TPC adjustment manager 735, an uplink transmission manager 740, a DCI manager 745, or any combination thereof. Each of these components may communicate, directly or indirectly, with one another (e.g., via one or more buses).

The communications manager 720 may support wireless communication at a UE in accordance with examples as disclosed herein. The accumulation mode TPC manager 725 may be configured as or otherwise support a means for receiving a first transmit power control command in a closed loop transmit power control procedure in which adjustments to transmit power are accumulated over multiple transmit power control commands. The transmit power manager 730 may be configured as or otherwise support a means for setting an uplink transmit power, based on the first transmit power control command, to a first transmit power. The temporary TPC adjustment manager 735 may be configured as or otherwise support a means for receiving a second transmit power control command to make a temporary adjustment to the uplink transmit power. In some examples, the transmit power manager 730 may be configured as or otherwise support a means for adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The uplink transmission manager 740 may be configured as or otherwise support a means for transmitting the one or more transmissions associated with the second transmit power control command at the second transmit power.

In some examples, to support adjusting the uplink transmit power, the temporary TPC adjustment manager 735 may be configured as or otherwise support a means for performing a one-time power adjustment for a first uplink transmission after receipt of the second transmit power control command. In some examples, to support adjusting the uplink transmit power, the temporary TPC adjustment manager 735 may be configured as or otherwise support a means for adjusting the transmit power back to the first transmit power after the first uplink transmission. In some examples, the second transmit power control command provides an increased power adjustment for a full duplex slot in which a network entity transmits to a different UE concurrently with receiving the one or more transmissions associated with the temporary adjustment. In some examples, the temporary adjustment to the uplink transmit power is performed according to an accumulation mode of the closed loop transmit power control procedure.

In some examples, to support receiving the second transmit power control command, the DCI manager 745 may be configured as or otherwise support a means for receiving a transmit power control command with a one-time application indication in a downlink control information transmission that schedules the one or more transmissions associated with the temporary adjustment. In some examples, to support receiving a second transmit power control command, the DCI manager 745 may be configured as or otherwise support a means for receiving a transmit power control command with a one-time application indication in a downlink control information transmission that is separate from a downlink control information transmission that schedules the one or more transmissions associated with the temporary adjustment.

In some examples, the second transmit power control command includes a one-time application indication field that indicates that an adjustment provided in a transmit power control command field is mapped to a set of power adjustment values that are different from values used for accumulation mode power control. In some examples, the set of power adjustment values provide increased uplink transmit power relative to power adjustments that are applied in an absence of the one-time application indication field indicating the temporary adjustment to the uplink transmit power.

Figure 8:
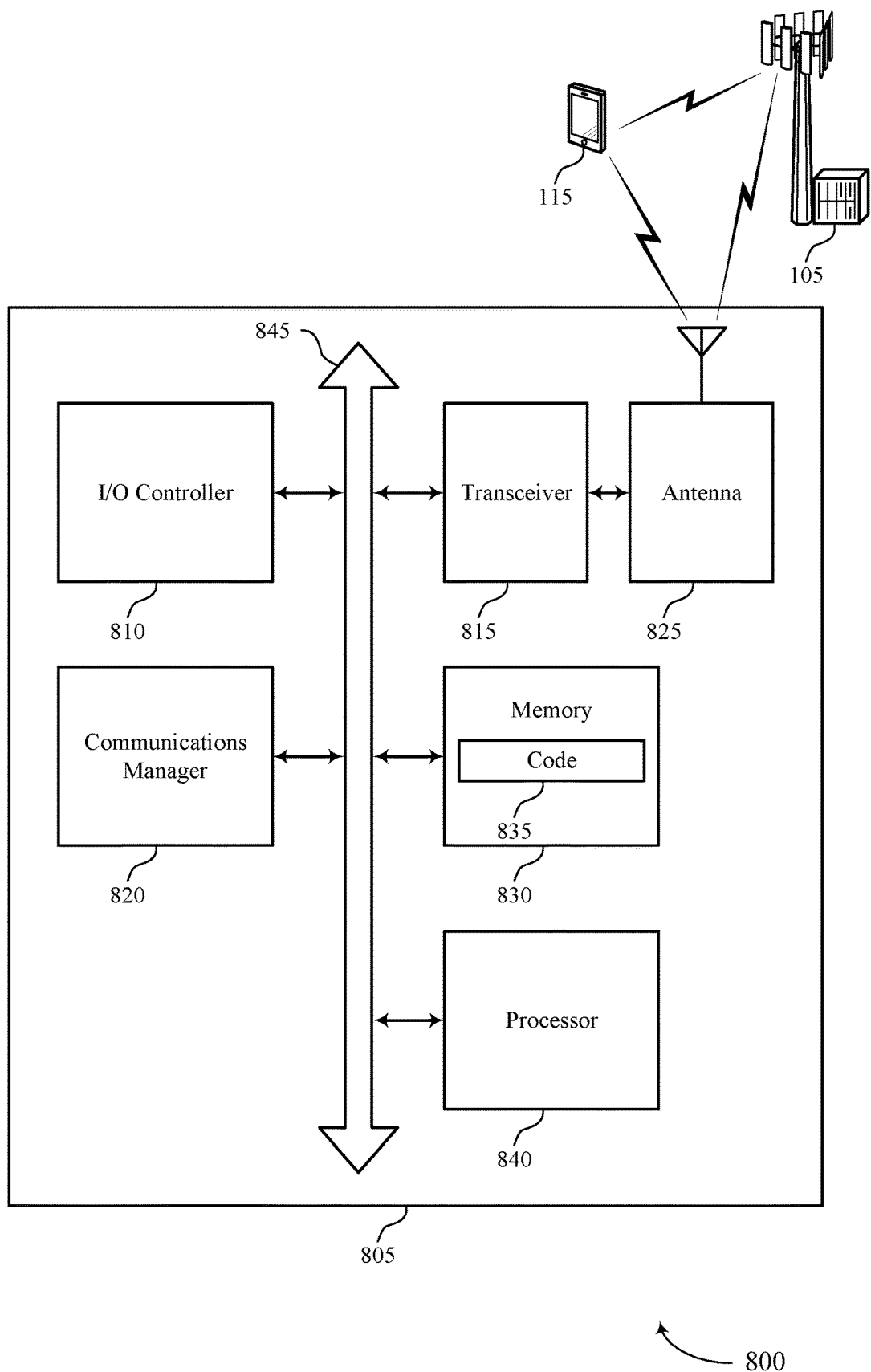
FIG. 8 shows a diagram of a system including a device that supports transmit power adjustment techniques in wireless communications in accordance with one or more aspects of the present disclosure.

FIG. 8 shows a diagram of a system 800 including a device 805 that supports transmit power adjustment techniques in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting transmit power adjustment techniques in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first transmit power control command in a closed loop transmit power control procedure in which adjustments to transmit power are accumulated over multiple transmit power control commands. The communications manager 820 may be configured as or otherwise support a means for setting an uplink transmit power, based on the first transmit power control command, to a first transmit power. The communications manager 820 may be configured as or otherwise support a means for receiving a second transmit power control command to make a temporary adjustment to the uplink transmit power. The communications manager 820 may be configured as or otherwise support a means for adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The communications manager 820 may be configured as or otherwise support a means for transmitting the one or more transmissions associated with the second transmit power control command at the second transmit power.

By including or configuring the communications manager 820 in accordance with examples as described herein, the device 805 may support techniques for transmit power adjustments for one or more identified slots while maintaining transmit power according unadjusted determinations for other slots, which may help to enhance reliability of communications in the identified slots, enhance network efficiency through reduced overhead, and enhance throughput through mitigation of interference in the identified slots. Described techniques may also provide for reduced power consumption through fewer control information transmissions that provide for application of power control adjustments that are targeted for transmissions in which increased transmit power would be beneficial, while other transmissions may use lower transmit power.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of transmit power adjustment techniques in wireless communications as described herein, or the processor 840 and the memory 830 may be otherwise configured to perform or support such operations.

Figure 9:
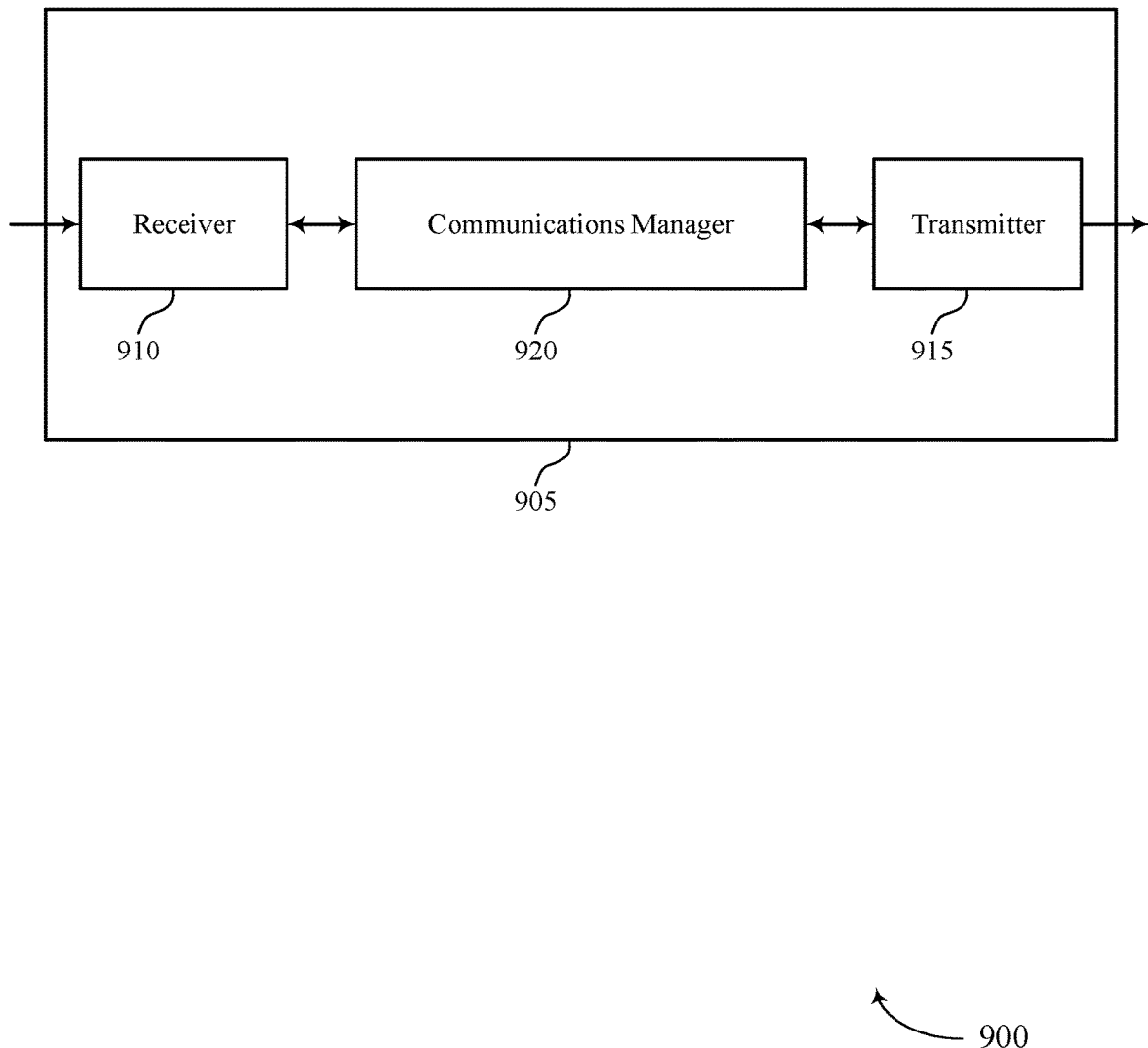
FIGS. 9 and 10 show block diagrams of devices that support transmit power adjustment techniques in wireless communications in accordance with one or more aspects of the present disclosure.

FIG. 9 shows a block diagram 900 of a device 905 that supports transmit power adjustment techniques in wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of transmit power adjustment techniques in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The communications manager 920 may be configured as or otherwise support a means for transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission. The communications manager 920 may be configured as or otherwise support a means for receiving the first uplink transmission while transmitting one or more downlink transmissions to at least a second UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for transmit power adjustments for one or more identified slots while maintaining transmit power according unadjusted determinations for other slots, which may help to enhance reliability of communications in the identified slots, enhance network efficiency through reduced overhead, and enhance throughput through mitigation of interference in the identified slots. Described techniques may also provide for reduced power consumption through fewer control information transmissions that provide for application of power control adjustments that are targeted for transmissions in which increased transmit power would be beneficial, while other transmissions may use lower transmit power.

Figure 10:
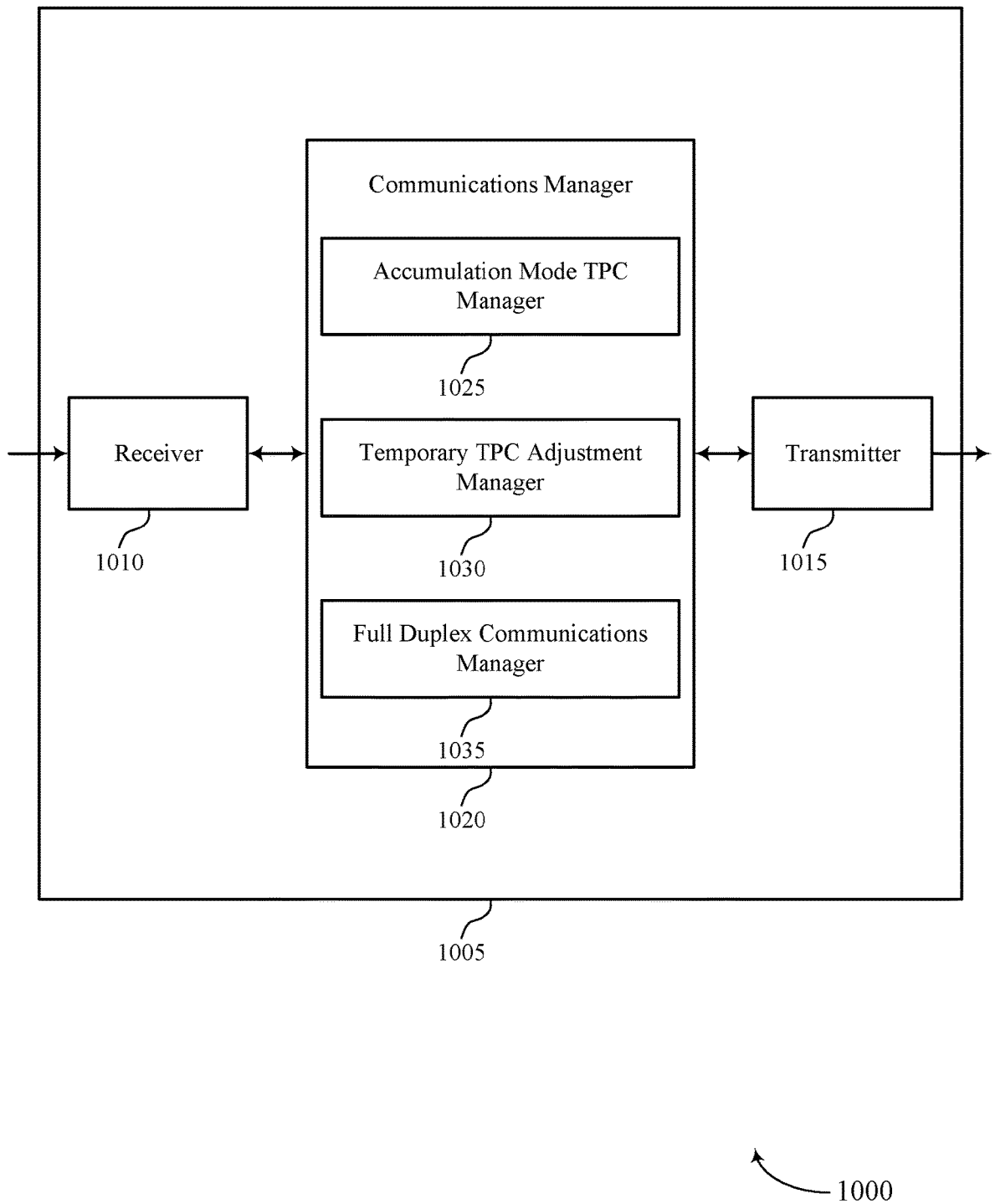

FIG. 10 shows a block diagram 1000 of a device 1005 that supports transmit power adjustment techniques in wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of transmit power adjustment techniques in wireless communications as described herein. For example, the communications manager 1020 may include an accumulation mode TPC manager 1025, a temporary TPC adjustment manager 1030, a full duplex communications manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The accumulation mode TPC manager 1025 may be configured as or otherwise support a means for transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The temporary TPC adjustment manager 1030 may be configured as or otherwise support a means for transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission. The full duplex communications manager 1035 may be configured as or otherwise support a means for receiving the first uplink transmission while transmitting one or more downlink transmissions to at least a second UE.

Figure 11:
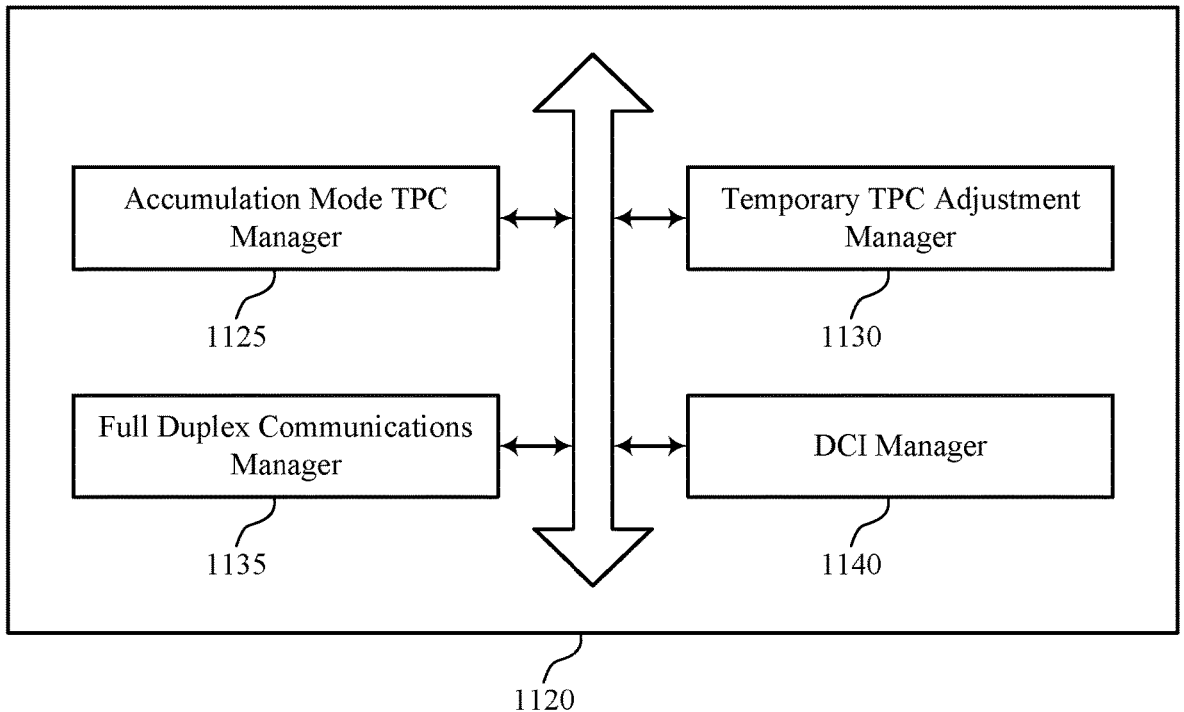
FIG. 11 shows a block diagram of a communications manager that supports transmit power adjustment techniques in wireless communications in accordance with one or more aspects of the present disclosure.

FIG. 11 shows a block diagram 1100 of a communications manager 1120 that supports transmit power adjustment techniques in wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of transmit power adjustment techniques in wireless communications as described herein. For example, the communications manager 1120 may include an accumulation mode TPC manager 1125, a temporary TPC adjustment manager 1130, a full duplex communications manager 1135, a DCI manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The accumulation mode TPC manager 1125 may be configured as or otherwise support a means for transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The temporary TPC adjustment manager 1130 may be configured as or otherwise support a means for transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission. The full duplex communications manager 1135 may be configured as or otherwise support a means for receiving the first uplink transmission while transmitting one or more downlink transmissions to at least a second UE.

In some examples, the second transmit power control command indicates that the first UE is to perform a one-time power adjustment for the first uplink transmission after receipt of the second transmit power control command, and that the first UE is to adjust the uplink transmit power back to the first transmit power after the first uplink transmission. In some examples, the second transmit power control command provides an increased power adjustment for a full duplex slot in which the network entity transmits to at least the second UE concurrently with receiving one or more transmissions associated with the temporary adjustment. In some examples, the temporary adjustment to the uplink transmit power is performed according to an accumulation mode of the closed loop transmit power control procedure.

In some examples, to support transmitting the second transmit power control command, the DCI manager 1140 may be configured as or otherwise support a means for transmitting a transmit power control command with a one-time application indication in a downlink control information transmission that schedules the first uplink transmission. In some examples, to support transmitting the second transmit power control command, the DCI manager 1140 may be configured as or otherwise support a means for transmitting a transmit power control command with a one-time application indication in a downlink control information transmission that is separate from a downlink control information transmission that schedules the first uplink transmission.

In some examples, the second transmit power control command includes a one-time application indication field that indicates that an adjustment provided in a transmit power control command field is mapped to a set of power adjustment values that are different from values used for accumulation mode power control. In some examples, the set of power adjustment values provide increased uplink transmit power relative to power adjustments that are applied in an absence of the one-time application indication field indicating the temporary adjustment to the uplink transmit power.

Figure 12:
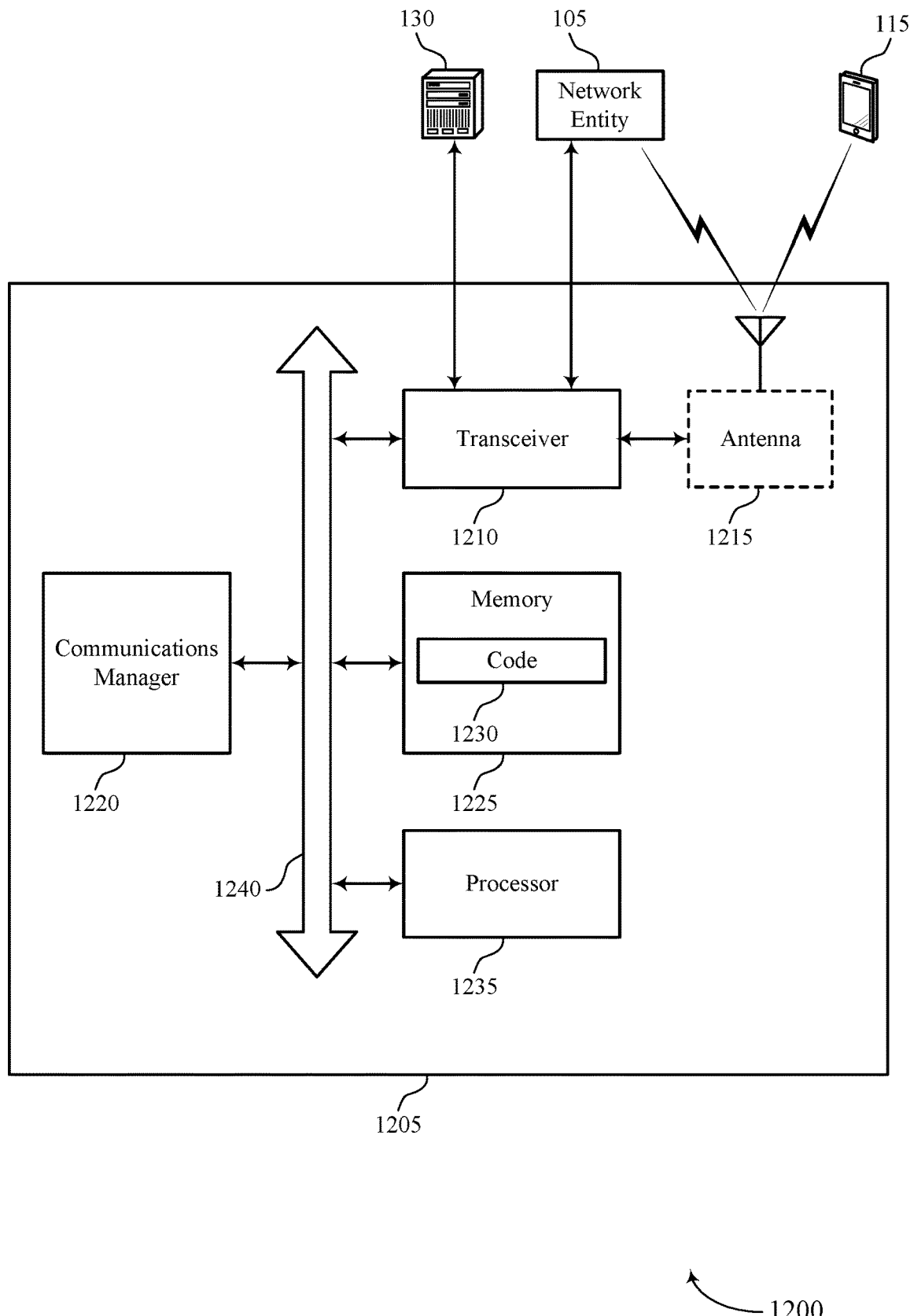
FIG. 12 shows a diagram of a system including a device that supports transmit power adjustment techniques in wireless communications in accordance with one or more aspects of the present disclosure.

FIG. 12 shows a diagram of a system 1200 including a device 1205 that supports transmit power adjustment techniques in wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting transmit power adjustment techniques in wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The communications manager 1220 may be configured as or otherwise support a means for transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission. The communications manager 1220 may be configured as or otherwise support a means for receiving the first uplink transmission while transmitting one or more downlink transmissions to at least a second UE.

By including or configuring the communications manager 1220 in accordance with examples as described herein, the device 1205 may support techniques for transmit power adjustments for one or more identified slots while maintaining transmit power according unadjusted determinations for other slots, which may help to enhance reliability of communications in the identified slots, enhance network efficiency through reduced overhead, and enhance throughput through mitigation of interference in the identified slots. Described techniques may also provide for reduced power consumption through fewer control information transmissions that provide for application of power control adjustments that are targeted for transmissions in which increased transmit power would be beneficial, while other transmissions may use lower transmit power.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of transmit power adjustment techniques in wireless communications as described herein, or the processor 1235 and the memory 1225 may be otherwise configured to perform or support such operations.

Figure 13:
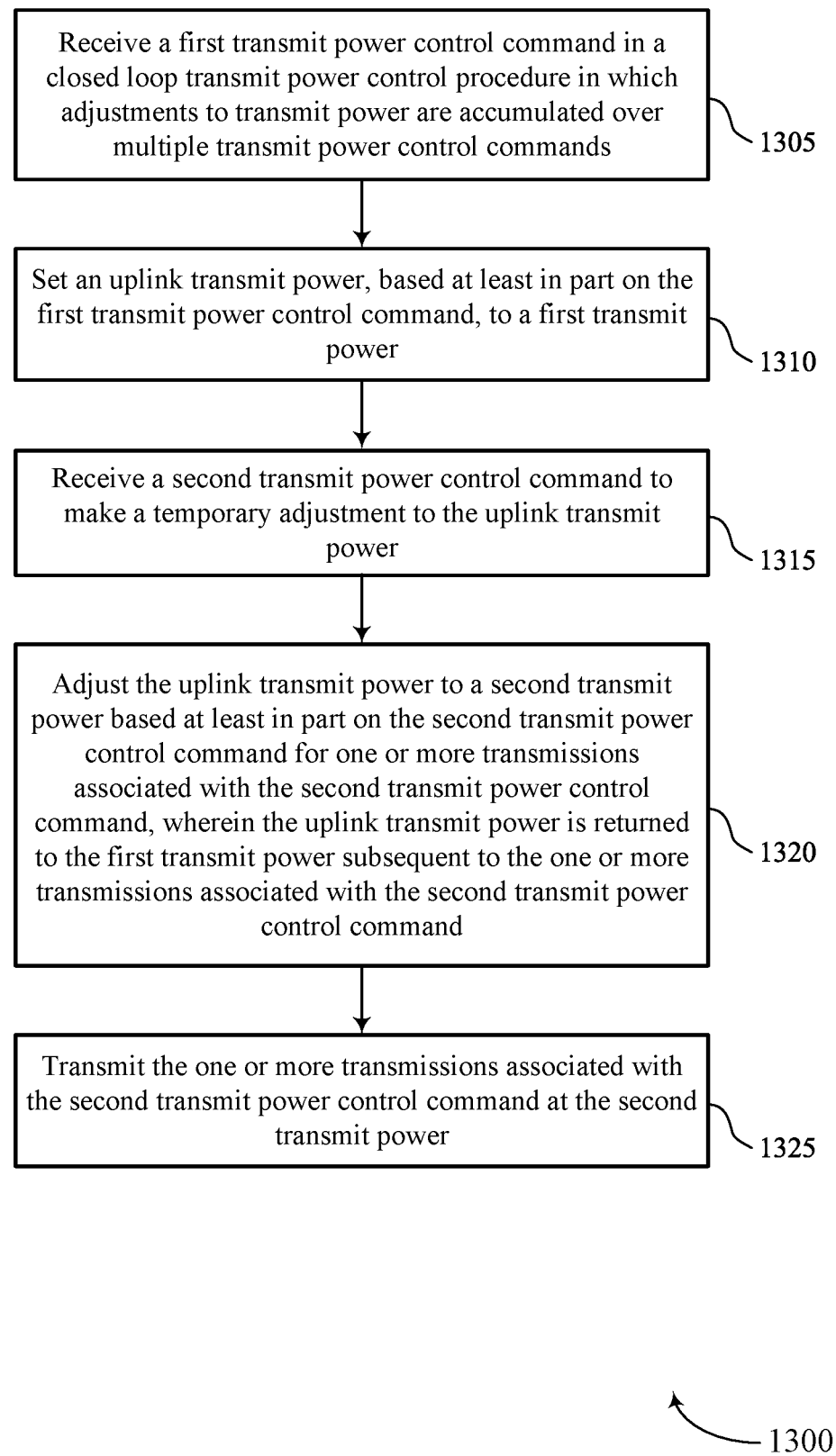
FIGS. 13 through 19 show flowcharts illustrating methods that support transmit power adjustment techniques in wireless communications in accordance with one or more aspects of the present disclosure.

FIG. 13 shows a flowchart illustrating a method 1300 that supports transmit power adjustment techniques in wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first transmit power control command in a closed loop transmit power control procedure in which adjustments to transmit power are accumulated over multiple transmit power control commands. The operations of 1305 may be performed in accordance with examples as disclosed herein. In some examples, aspects of the operations of 1305 may be performed by an accumulation mode TPC manager 725 as described with reference to FIG. 7.

At 1310, the method may include setting an uplink transmit power, based on the first transmit power control command, to a first transmit power. The operations of 1310 may be performed in accordance with examples as disclosed herein. In some examples, aspects of the operations of 1310 may be performed by a transmit power manager 730 as described with reference to FIG. 7.

At 1315, the method may include receiving a second transmit power control command to make a temporary adjustment to the uplink transmit power. The operations of 1315 may be performed in accordance with examples as disclosed herein. In some examples, aspects of the operations of 1315 may be performed by a temporary TPC adjustment manager 735 as described with reference to FIG. 7.

At 1320, the method may include adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The operations of 1320 may be performed in accordance with examples as disclosed herein. In some examples, aspects of the operations of 1320 may be performed by a transmit power manager 730 as described with reference to FIG. 7.

At 1325, the method may include transmitting the one or more transmissions associated with the second transmit power control command at the second transmit power. The operations of 1325 may be performed in accordance with examples as disclosed herein. In some examples, aspects of the operations of 1325 may be performed by an uplink transmission manager 740 as described with reference to FIG. 7.

Figure 14:
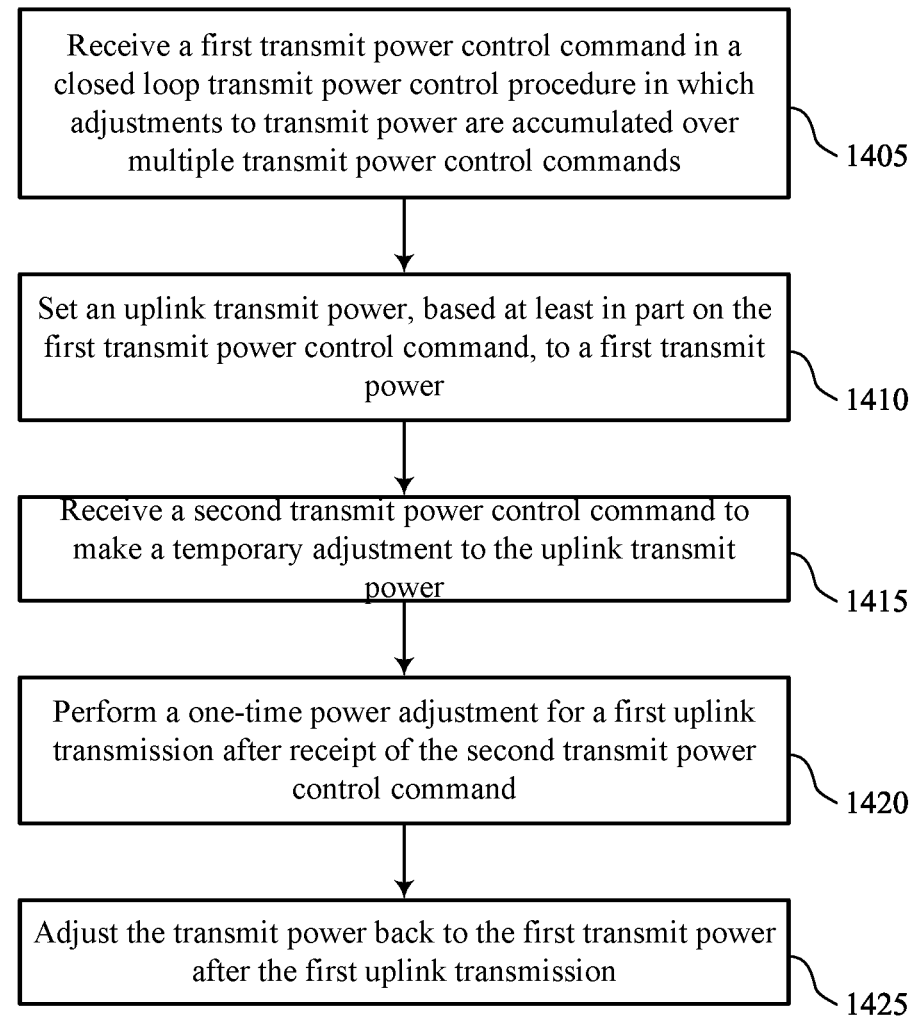

FIG. 14 shows a flowchart illustrating a method 1400 that supports transmit power adjustment techniques in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first transmit power control command in a closed loop transmit power control procedure in which adjustments to transmit power are accumulated over multiple transmit power control commands. The operations of 1405 may be performed in accordance with examples as disclosed herein. In some examples, aspects of the operations of 1405 may be performed by an accumulation mode TPC manager 725 as described with reference to FIG. 7.

At 1410, the method may include setting an uplink transmit power, based on the first transmit power control command, to a first transmit power. The operations of 1410 may be performed in accordance with examples as disclosed herein. In some examples, aspects of the operations of 1410 may be performed by a transmit power manager 730 as described with reference to FIG. 7.

At 1415, the method may include receiving a second transmit power control command to make a temporary adjustment to the uplink transmit power. The operations of 1415 may be performed in accordance with examples as disclosed herein. In some examples, aspects of the operations of 1415 may be performed by a temporary TPC adjustment manager 735 as described with reference to FIG. 7.

At 1420, the method may include performing a one-time power adjustment for a first uplink transmission after receipt of the second transmit power control command. The operations of 1420 may be performed in accordance with examples as disclosed herein. In some examples, aspects of the operations of 1420 may be performed by a temporary TPC adjustment manager 735 as described with reference to FIG. 7.

At 1425, the method may include adjusting the transmit power back to the first transmit power after the first uplink transmission. The operations of 1425 may be performed in accordance with examples as disclosed herein. In some examples, aspects of the operations of 1425 may be performed by a temporary TPC adjustment manager 735 as described with reference to FIG. 7.

Figure 15:
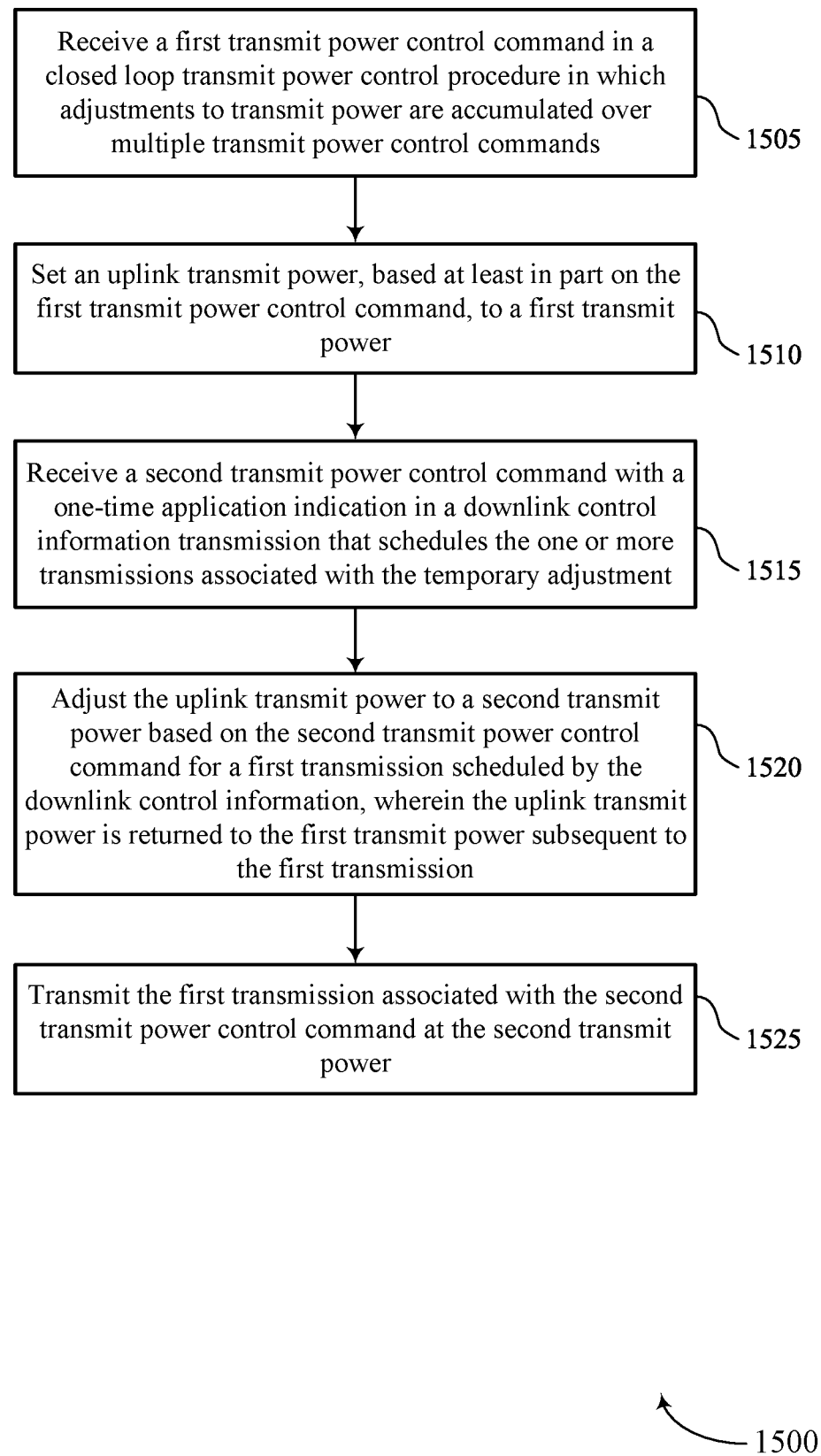

FIG. 15 shows a flowchart illustrating a method 1500 that supports transmit power adjustment techniques in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first transmit power control command in a closed loop transmit power control procedure in which adjustments to transmit power are accumulated over multiple transmit power control commands. The operations of 1505 may be performed in accordance with examples as disclosed herein. In some examples, aspects of the operations of 1505 may be performed by an accumulation mode TPC manager 725 as described with reference to FIG. 7.

At 1510, the method may include setting an uplink transmit power, based on the first transmit power control command, to a first transmit power. The operations of 1510 may be performed in accordance with examples as disclosed herein. In some examples, aspects of the operations of 1510 may be performed by a transmit power manager 730 as described with reference to FIG. 7.

At 1515, the method may include receiving a second transmit power control command with a one-time application indication in a downlink control information transmission that schedules the one or more transmissions associated with the temporary adjustment. The operations of 1515 may be performed in accordance with examples as disclosed herein. In some examples, aspects of the operations of 1515 may be performed by a DCI manager 745 as described with reference to FIG. 7.

At 1520, the method may include adjusting the uplink transmit power to a second transmit power based on the second transmit power control command for a first transmission scheduled by the downlink control information, where the uplink transmit power is returned to the first transmit power subsequent to the first transmission. The operations of 1520 may be performed in accordance with examples as disclosed herein. In some examples, aspects of the operations of 1520 may be performed by a transmit power manager 730 as described with reference to FIG. 7.

At 1525, the method may include transmitting the first transmission associated with the second transmit power control command at the second transmit power. The operations of 1525 may be performed in accordance with examples as disclosed herein. In some examples, aspects of the operations of 1525 may be performed by an uplink transmission manager 740 as described with reference to FIG. 7.

Figure 16:
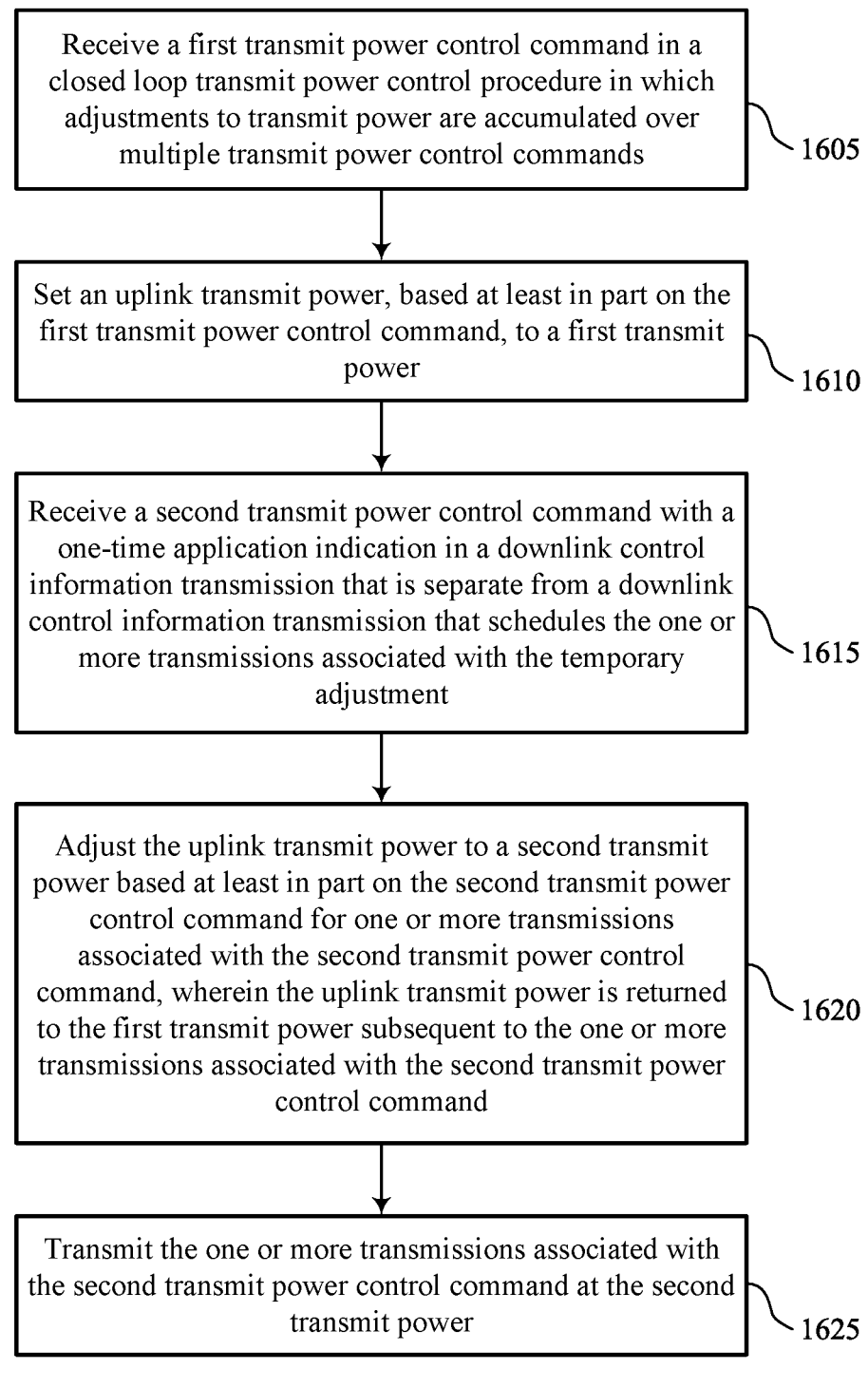

FIG. 16 shows a flowchart illustrating a method 1600 that supports transmit power adjustment techniques in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving a first transmit power control command in a closed loop transmit power control procedure in which adjustments to transmit power are accumulated over multiple transmit power control commands. The operations of 1605 may be performed in accordance with examples as disclosed herein. In some examples, aspects of the operations of 1605 may be performed by an accumulation mode TPC manager 725 as described with reference to FIG. 7.

At 1610, the method may include setting an uplink transmit power, based on the first transmit power control command, to a first transmit power. The operations of 1610 may be performed in accordance with examples as disclosed herein. In some examples, aspects of the operations of 1610 may be performed by a transmit power manager 730 as described with reference to FIG. 7.

At 1615, the method may include receiving a transmit power control command with a one-time application indication in a downlink control information transmission that is separate from a downlink control information transmission that schedules the one or more transmissions associated with the temporary adjustment. The operations of 1615 may be performed in accordance with examples as disclosed herein. In some examples, aspects of the operations of 1615 may be performed by a DCI manager 745 as described with reference to FIG. 7.

At 1620, the method may include adjusting the uplink transmit power to a second transmit power based on the second transmit power control command for one or more transmissions associated with the second transmit power control command, where the uplink transmit power is returned to the first transmit power subsequent to the one or more transmissions associated with the second transmit power control command. The operations of 1620 may be performed in accordance with examples as disclosed herein. In some examples, aspects of the operations of 1620 may be performed by a transmit power manager 730 as described with reference to FIG. 7.

At 1625, the method may include transmitting the one or more transmissions associated with the second transmit power control command at the second transmit power. The operations of 1625 may be performed in accordance with examples as disclosed herein. In some examples, aspects of the operations of 1625 may be performed by an uplink transmission manager 740 as described with reference to FIG. 7.

Figure 17:
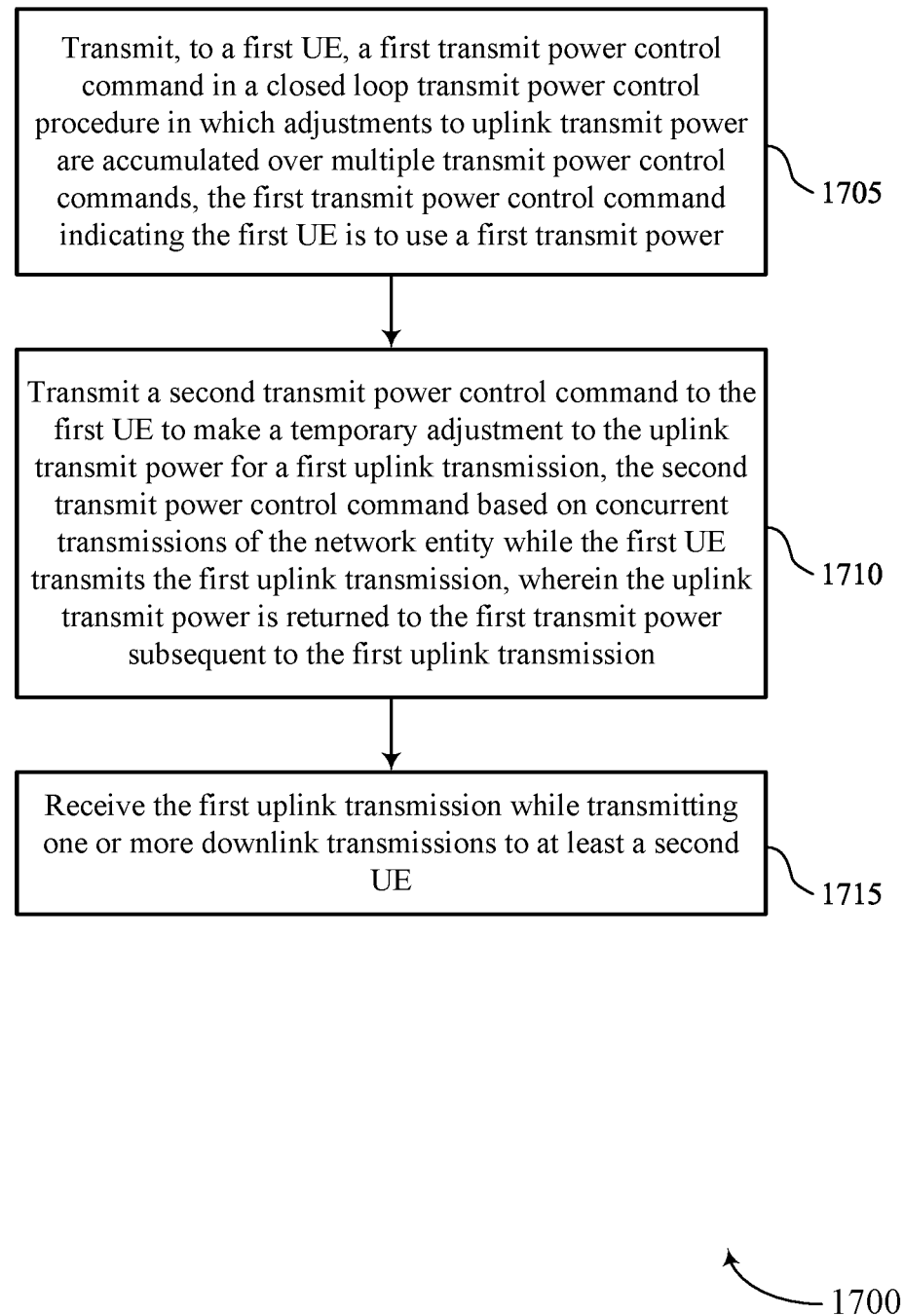

FIG. 17 shows a flowchart illustrating a method 1700 that supports transmit power adjustment techniques in wireless communications in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The operations of 1705 may be performed in accordance with examples as disclosed herein. In some examples, aspects of the operations of 1705 may be performed by an accumulation mode TPC manager 1125 as described with reference to FIG. 11.

At 1710, the method may include transmitting a second transmit power control command to the first UE to make a temporary adjustment to the uplink transmit power for a first uplink transmission, the second transmit power control command based on concurrent transmissions of the network entity while the first UE transmits the first uplink transmission, where the uplink transmit power is returned to the first transmit power subsequent to the first uplink transmission. The operations of 1710 may be performed in accordance with examples as disclosed herein. In some examples, aspects of the operations of 1710 may be performed by a temporary TPC adjustment manager 1130 as described with reference to FIG. 11.

At 1715, the method may include receiving the first uplink transmission while transmitting one or more downlink transmissions to at least a second UE. The operations of 1715 may be performed in accordance with examples as disclosed herein. In some examples, aspects of the operations of 1715 may be performed by a full duplex communications manager 1135 as described with reference to FIG. 11.

Figure 18:
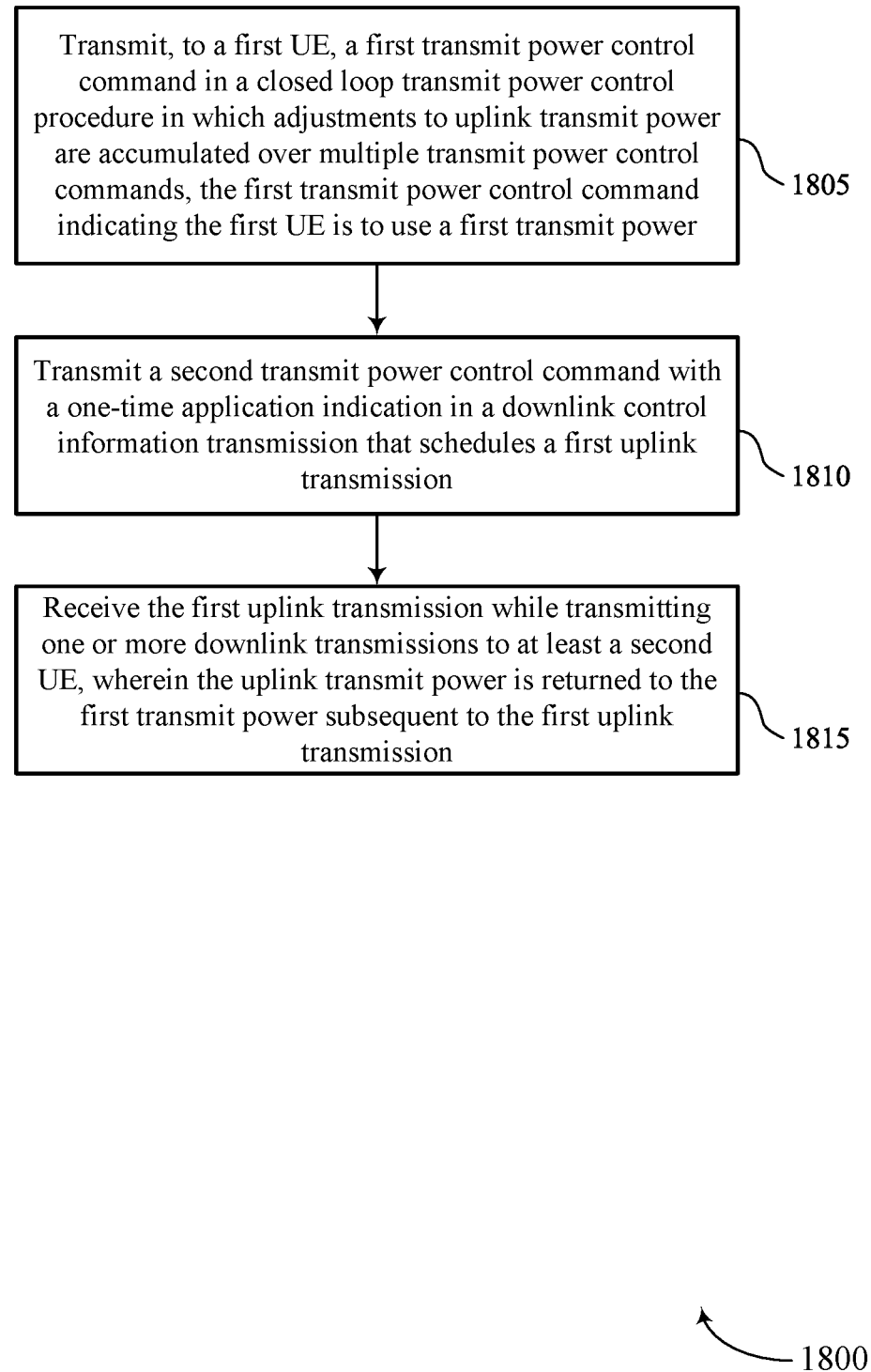

FIG. 18 shows a flowchart illustrating a method 1800 that supports transmit power adjustment techniques in wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The operations of 1805 may be performed in accordance with examples as disclosed herein. In some examples, aspects of the operations of 1805 may be performed by an accumulation mode TPC manager 1125 as described with reference to FIG. 11.

At 1810, the method may include transmitting a second transmit power control command with a one-time application indication in a downlink control information transmission that schedules a first uplink transmission. The operations of 1810 may be performed in accordance with examples as disclosed herein. In some examples, aspects of the operations of 1810 may be performed by a DCI manager 1140 as described with reference to FIG. 11.

At 1815, the method may include receiving the first uplink transmission while transmitting one or more downlink transmissions to at least a second UE, where the uplink transmit power is returned to the first transmit power subsequent to the first uplink transmission. The operations of 1815 may be performed in accordance with examples as disclosed herein. In some examples, aspects of the operations of 1815 may be performed by a full duplex communications manager 1135 as described with reference to FIG. 11.

Figure 19:
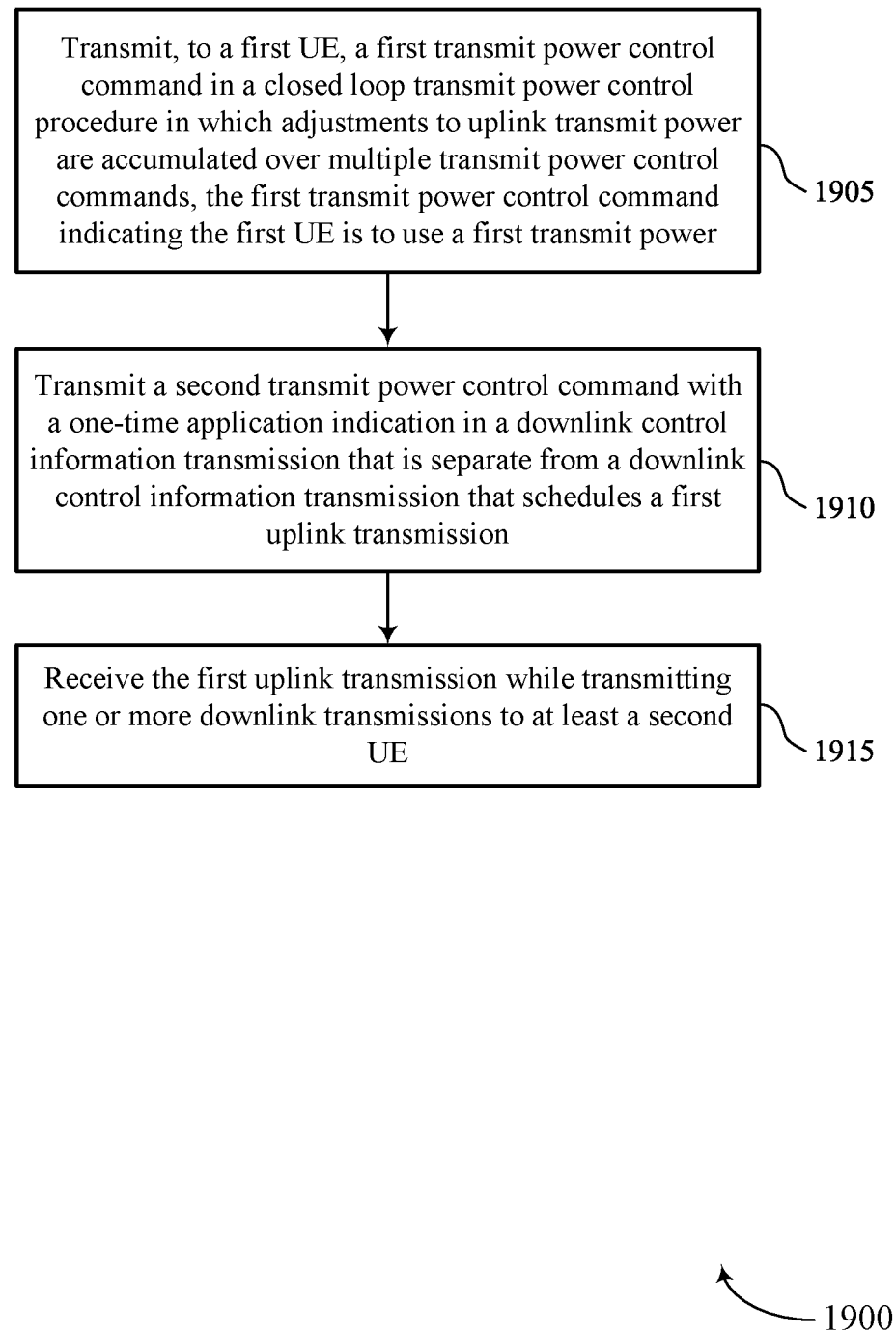

FIG. 19 shows a flowchart illustrating a method 1900 that supports transmit power adjustment techniques in wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a first UE, a first transmit power control command in a closed loop transmit power control procedure in which adjustments to uplink transmit power are accumulated over multiple transmit power control commands, the first transmit power control command indicating the first UE is to use a first transmit power. The operations of 1905 may be performed in accordance with examples as disclosed herein. In some examples, aspects of the operations of 1905 may be performed by an accumulation mode TPC manager 1125 as described with reference to FIG. 11.

At 1910, the method may include transmitting a second transmit power control command with a one-time application indication in a downlink control information transmission that is separate from a downlink control information transmission that schedules a first uplink transmission, where the uplink transmit power is returned to the first transmit power subsequent to the first uplink transmission. The operations of 1910 may be performed in accordance with examples as disclosed herein. In some examples, aspects of the operations of 1910 may be performed by a DCI manager 1140 as described with reference to FIG. 11.

At 1915, the method may include receiving the first uplink transmission while transmitting one or more downlink transmissions to at least a second UE. The operations of 1915 may be performed in accordance with examples as disclosed herein. In some examples, aspects of the operations of 1915 may be performed by a full duplex communications manager 1135 as described with reference to FIG. 11.

The following provides an overview of aspects of the present disclosure:

Aspect 1: A method for wireless communication at a UE, comprising: receiving a first transmit power control command in a closed loop transmit power control procedure in which adjustments to transmit power are accumulated over multiple transmit power control commands; setting an uplink transmit power, based at least in part on the first transmit power control command, to a first transmit power; receiving a second transmit power control command to make a temporary adjustment to the uplink transmit power; adjusting the uplink transmit power to a second transmit power based at least in part on the second transmit power control command for one or more transmissions associated with the second transmit power control command, wherein the uplink transmit power is returned to the first transmit power subsequent to the one or more transmissions associated with the second transmit power control command; and transmitting the one or more transmissions associated with the second transmit power control command at the second transmit power.

Aspect 2: The method of aspect 1, wherein the adjusting the uplink transmit power comprises: performing a one-time power adjustment for a first uplink transmission after receipt of the second transmit power control command; and adjusting the transmit power back to the first transmit power after the first uplink transmission.

Aspect 3: The method of any of aspects 1 through 2, wherein the second transmit power control command provides an increased power adjustment for a full duplex slot in which a network entity transmits to a different UE concurrently with receiving the one or more transmissions associated with the temporary adjustment.

Aspect 4: The method of any of aspects 1 through 3, wherein the temporary adjustment to the uplink transmit power is performed according to an accumulation mode of the closed loop transmit power control procedure.

Aspect 5: The method of any of aspects 1 through 4, wherein the receiving the second transmit power control command comprises: receiving a transmit power control command with a one-time application indication in a downlink control information transmission that schedules the one or more transmissions associated with the temporary adjustment.

Aspect 6: The method of any of aspects 1 through 4, wherein the receiving a second transmit power control command comprises: receiving a transmit power control command with a one-time application indication in a downlink control information transmission that is separate from a downlink control information transmission that schedules the one or more transmissions associated with the temporary adjustment.

Aspect 7: The method of any of aspects 1 through 6, wherein the second transmit power control command includes a one-time application indication field that indicates that an adjustment provided in a transmit power control command field is mapped to a set of power adjustment values that are different from values used for accumulation mode power control.

Aspect 8: The method of aspect 7, wherein the set of power adjustment values provide increased uplink transmit power relative to power adjustments that are applied in an absence of the one-time application indication field indicating the temporary adjustment to the uplink transmit power.

Aspect 9: A method for wireless communication at a network entity, comprising: transmitting, to a first UE, a first transmit power control command in a closed loop transmit power control procedure in which adjustments to uplink transmit power are accumulated over multiple transmit power control commands, the first transmit power control command indicating the first UE is to use a first transmit power; transmitting a second transmit power control command to the first UE to make a temporary adjustment to the uplink transmit power for a first uplink transmission, the second transmit power control command based on concurrent transmissions of the network entity while the first UE transmits the first uplink transmission, wherein the uplink transmit power is returned to the first transmit power subsequent to the first uplink transmission; and receiving the first uplink transmission while transmitting one or more downlink transmissions to at least a second UE.

Aspect 10: The method of aspect 9, wherein the second transmit power control command indicates that the first UE is to perform a one-time power adjustment for the first uplink transmission after receipt of the second transmit power control command, and that the first UE is to adjust the uplink transmit power back to the first transmit power after the first uplink transmission.

Aspect 11: The method of any of aspects 9 through 10, wherein the second transmit power control command provides an increased power adjustment for a full duplex slot in which the network entity transmits to at least the second UE concurrently with receiving one or more transmissions associated with the temporary adjustment.

Aspect 12: The method of any of aspects 9 through 11, wherein the temporary adjustment to the uplink transmit power is performed according to an accumulation mode of the closed loop transmit power control procedure.

Aspect 13: The method of any of aspects 9 through 12, wherein the transmitting the second transmit power control command comprises: transmitting a transmit power control command with a one-time application indication in a downlink control information transmission that schedules the first uplink transmission.

Aspect 14: The method of any of aspects 9 through 12, wherein the transmitting the second transmit power control command comprises: transmitting a transmit power control command with a one-time application indication in a downlink control information transmission that is separate from a downlink control information transmission that schedules the first uplink transmission.

Aspect 15: The method of any of aspects 9 through 14, wherein the second transmit power control command includes a one-time application indication field that indicates that an adjustment provided in a transmit power control command field is mapped to a set of power adjustment values that are different from values used for accumulation mode power control.

Aspect 16: The method of aspect 15, wherein the set of power adjustment values provide increased uplink transmit power relative to power adjustments that are applied in an absence of the one-time application indication field indicating the temporary adjustment to the uplink transmit power.

Aspect 17: An apparatus for wireless communication at a UE, comprising a processor; and a memory coupled with the processor, with instructions stored in the memory, the instructions being executable by the processor to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at a network entity, comprising a processor; and a memory coupled with the processor, with instructions stored in the memory, the instructions being executable by the processor to cause the apparatus to perform a method of any of aspects 9 through 16.

Aspect 21: An apparatus for wireless communication at a network entity, comprising at least one means for performing a method of any of aspects 9 through 16.

Aspect 22: A non-transitory computer-readable medium storing code for wireless communication at a network entity, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first transmit power control command in a closed loop transmit power control procedure in which adjustments to transmit power are accumulated over multiple transmit power control commands;
   setting an uplink transmit power, based at least in part on the first transmit power control command, to a first transmit power;
   receiving a second transmit power control command to make a temporary adjustment to the uplink transmit power;
   adjusting the uplink transmit power to a second transmit power based at least in part on the second transmit power control command for one or more transmissions associated with the second transmit power control command, wherein the uplink transmit power is returned to the first transmit power subsequent to the one or more transmissions associated with the second transmit power control command; and
   transmitting the one or more transmissions associated with the second transmit power control command at the second transmit power.

2. The method of claim 1, wherein the adjusting the uplink transmit power comprises:
   performing a one-time power adjustment for a first uplink transmission after receipt of the second transmit power control command; and
   adjusting the transmit power back to the first transmit power after the first uplink transmission.

3. The method of claim 1, wherein the second transmit power control command provides an increased power adjustment for a full duplex slot in which a network entity transmits to a different UE concurrently with receiving the one or more transmissions associated with the temporary adjustment.

4. The method of claim 1, wherein the temporary adjustment to the uplink transmit power is performed according to an accumulation mode of the closed loop transmit power control procedure.

5. The method of claim 1, wherein the receiving the second transmit power control command comprises:
   receiving a transmit power control command with a one-time application indication in a downlink control information transmission that schedules the one or more transmissions associated with the temporary adjustment.

6. The method of claim 1, wherein the receiving a second transmit power control command comprises:
   receiving a transmit power control command with a one-time application indication in a downlink control information transmission that is separate from a downlink control information transmission that schedules the one or more transmissions associated with the temporary adjustment.

7. The method of claim 1, wherein the second transmit power control command includes a one-time application indication field that indicates that an adjustment provided in a transmit power control command field is mapped to a set of power adjustment values that are different from values used for accumulation mode power control.

8. The method of claim 7, wherein the set of power adjustment values provide increased uplink transmit power relative to power adjustments that are applied in an absence of the one-time application indication field indicating the temporary adjustment to the uplink transmit power.

9. A method for wireless communication at a network entity, comprising:
   transmitting, to a first user equipment (UE), a first transmit power control command in a closed loop transmit power control procedure in which adjustments to uplink transmit power are accumulated over multiple transmit power control commands, the first transmit power control command indicating the first UE is to use a first transmit power;
   transmitting a second transmit power control command to the first UE to make a temporary adjustment to the uplink transmit power for a first uplink transmission, the second transmit power control command based on concurrent transmissions of the network entity while the first UE transmits the first uplink transmission, wherein the uplink transmit power is returned to the first transmit power subsequent to the first uplink transmission; and
   receiving the first uplink transmission while transmitting one or more downlink transmissions to at least a second UE.

10. The method of claim 9, wherein the second transmit power control command indicates that the first UE is to perform a one-time power adjustment for the first uplink transmission after receipt of the second transmit power control command, and that the first UE is to adjust the uplink transmit power back to the first transmit power after the first uplink transmission.

11. The method of claim 9, wherein the second transmit power control command provides an increased power adjustment for a full duplex slot in which the network entity transmits to at least the second UE concurrently with receiving one or more transmissions associated with the temporary adjustment.

12. The method of claim 9, wherein the temporary adjustment to the uplink transmit power is performed according to an accumulation mode of the closed loop transmit power control procedure.

13. The method of claim 9, wherein the transmitting the second transmit power control command comprises:
   transmitting a transmit power control command with a one-time application indication in a downlink control information transmission that schedules the first uplink transmission.

14. The method of claim 9, wherein the transmitting the second transmit power control command comprises:
   transmitting a transmit power control command with a one-time application indication in a downlink control information transmission that is separate from a downlink control information transmission that schedules the first uplink transmission.

15. The method of claim 9, wherein the second transmit power control command includes a one-time application indication field that indicates that an adjustment provided in a transmit power control command field is mapped to a set of power adjustment values that are different from values used for accumulation mode power control.

16. The method of claim 15, wherein the set of power adjustment values provide increased uplink transmit power relative to power adjustments that are applied in an absence of the one-time application indication field indicating the temporary adjustment to the uplink transmit power.

17. An apparatus for wireless communication at a user equipment (UE), comprising:
a processor; and
a memory coupled with the processor, with instructions stored in the memory, the instructions being executable by the processor to cause the apparatus to:
receive a first transmit power control command in a closed loop transmit power control procedure in which adjustments to transmit power are accumulated over multiple transmit power control commands;
set an uplink transmit power, based at least in part on the first transmit power control command, to a first transmit power;
receive a second transmit power control command to make a temporary adjustment to the uplink transmit power;
adjust the uplink transmit power to a second transmit power based at least in part on the second transmit power control command for one or more transmissions associated with the second transmit power control command, wherein the uplink transmit power is returned to the first transmit power subsequent to the one or more transmissions associated with the second transmit power control command; and
transmit the one or more transmissions associated with the second transmit power control command at the second transmit power.

18. The apparatus of claim 17, wherein the instructions to adjust the uplink transmit power are executable by the processor to cause the apparatus to:
perform a one-time power adjustment for a first uplink transmission after receipt of the second transmit power control command; and
adjust the transmit power back to the first transmit power after the first uplink transmission.

19. The apparatus of claim 17, wherein the second transmit power control command provides an increased power adjustment for a full duplex slot in which a network entity transmits to a different UE concurrently with receiving the one or more transmissions associated with the temporary adjustment.

20. The apparatus of claim 17, wherein the temporary adjustment to the uplink transmit power is performed according to an accumulation mode of the closed loop transmit power control procedure.

21. The apparatus of claim 17, wherein the instructions to receive the second transmit power control command are executable by the processor to cause the apparatus to:
receive a transmit power control command with a one-time application indication in a downlink control information transmission that schedules the one or more transmissions associated with the temporary adjustment.

22. The apparatus of claim 17, wherein the instructions to receive a second transmit power control command are executable by the processor to cause the apparatus to:
receive a transmit power control command with a one-time application indication in a downlink control information transmission that is separate from a downlink control information transmission that schedules the one or more transmissions associated with the temporary adjustment.

23. The apparatus of claim 17, wherein the second transmit power control command includes a one-time application indication field that indicates that an adjustment provided in a transmit power control command field is mapped to a set of power adjustment values that are different from values used for accumulation mode power control.

24. The apparatus of claim 23, wherein the set of power adjustment values provide increased uplink transmit power relative to power adjustments that are applied in an absence of the one-time application indication field indicating the temporary adjustment to the uplink transmit power.

25. An apparatus for wireless communication at a network entity, comprising:
a processor; and
a memory coupled with the processor, with instructions stored in the memory, the instructions being executable by the processor to cause the apparatus to:
transmit, to a first user equipment (UE), a first transmit power control command in a closed loop transmit power control procedure in which adjustments to uplink transmit power are accumulated over multiple transmit power control commands, the first transmit power control command indicating the first UE is to use a first transmit power;
transmit a second transmit power control command to the first UE to make a temporary adjustment to the uplink transmit power for a first uplink transmission, the second transmit power control command based on concurrent transmissions of the network entity while the first UE transmits the first uplink transmission, wherein the uplink transmit power is returned to the first transmit power subsequent to the first uplink transmission; and
receive the first uplink transmission while transmitting one or more downlink transmissions to at least a second UE.

26. The apparatus of claim 25, wherein the second transmit power control command indicates that the first UE is to perform a one-time power adjustment for the first uplink transmission after receipt of the second transmit power control command, and that the first UE is to adjust the uplink transmit power back to the first transmit power after the first uplink transmission.

27. The apparatus of claim 25, wherein the second transmit power control command provides an increased power adjustment for a full duplex slot in which the network entity transmits to at least the second UE concurrently with receiving one or more transmissions associated with the temporary adjustment.

28. The apparatus of claim 25, wherein the temporary adjustment to the uplink transmit power is performed according to an accumulation mode of the closed loop transmit power control procedure.

29. The apparatus of claim 25, wherein the instructions to transmit the second transmit power control command are executable by the processor to cause the apparatus to:
transmit a transmit power control command with a one-time application indication in a downlink control information transmission that schedules the first uplink transmission, or
transmit a transmit power control command with a one-time application indication in a downlink control information transmission that is separate from a downlink control information transmission that schedules the first uplink transmission.

30. The apparatus of claim 25, wherein the second transmit power control command includes a one-time application indication field that indicates that an adjustment provided in a transmit power control command field is mapped to a set of power adjustment values that are different from values used for accumulation mode power control, and wherein the set of power adjustment values provide increased uplink transmit power relative to power adjustments that are applied in an absence of the one-time application indication field indicating the temporary adjustment to the uplink transmit power.

* * * * *